US010620465B2

(12) United States Patent
Lee et al.

(10) Patent No.: US 10,620,465 B2
(45) Date of Patent: Apr. 14, 2020

(54) FLEXIBLE DISPLAY DEVICE

(71) Applicant: Samsung Display Co., Ltd., Yongin-si, Gyeonggi-do (KR)

(72) Inventors: Heeyoung Lee, Hwaseong-si (KR); Minju Oh, Suwon-si (KR); Hansun Ryou, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/039,069

(22) Filed: Jul. 18, 2018

(65) Prior Publication Data
US 2019/0086709 A1 Mar. 21, 2019

(30) Foreign Application Priority Data

Sep. 18, 2017 (KR) .................. 10-2017-0119762

(51) Int. Cl.
*G02F 1/1333* (2006.01)
*G02F 1/1335* (2006.01)
*G06F 1/16* (2006.01)

(52) U.S. Cl.
CPC .... *G02F 1/133305* (2013.01); *G02F 1/13338* (2013.01); *G02F 1/133308* (2013.01); *G02F 1/133528* (2013.01); *G06F 1/1643* (2013.01); *G06F 1/1652* (2013.01); *G02F 2001/133331* (2013.01); *G02F 2202/28* (2013.01); *G06F 2203/04102* (2013.01)

(58) Field of Classification Search
USPC ....................................... 361/749
See application file for complete search history.

(56) References Cited

U.S. PATENT DOCUMENTS

| 9,064,826 | B2 | 6/2015 | Nakazawa |
| 9,450,207 | B2 | 9/2016 | Lee et al. |
| 2015/0329747 | A1 | 11/2015 | Cho et al. |
| 2016/0077267 | A1 | 3/2016 | Inagaki |
| 2016/0122600 | A1 | 5/2016 | Moon et al. |
| 2016/0177146 | A1 | 6/2016 | Mun et al. |
| 2016/0285051 | A1 | 9/2016 | Lee et al. |
| 2017/0015880 | A1 | 1/2017 | Kim et al. |

(Continued)

FOREIGN PATENT DOCUMENTS

| JP | 2016-198931 A | 12/2016 |
| KR | 10-2014-0092361 | 7/2014 |

(Continued)

*Primary Examiner* — Andargie M Aychillhum
(74) *Attorney, Agent, or Firm* — Lewis Roca Rothgerber Christie LLP

(57) ABSTRACT

A flexible display device includes a display panel, a polarizing member disposed on the display panel and including an optical layer, a polarizer disposed on the optical layer, and one or more inner adhesive layers, a window member disposed on the polarizing member, a first outer adhesive layer disposed between the display panel and the polarizing member, and a second outer adhesive layer disposed between the polarizing member and the window member, wherein each of at least two adhesive layers among the one or more inner adhesive layers, the first outer adhesive layer, and the second outer adhesive layer includes an ultraviolet absorbing agent, and which is thus able to have improved reliability against external light and improved display quality.

20 Claims, 9 Drawing Sheets

(56) References Cited

U.S. PATENT DOCUMENTS

| | | | |
|---|---|---|---|
| 2017/0023718 A1 | 1/2017 | Son et al. | |
| 2017/0077440 A1 | 3/2017 | Yoo et al. | |
| 2017/0198177 A1* | 7/2017 | Olson | B32B 27/42 |
| 2017/0223821 A1* | 8/2017 | Wang | D01D 5/0084 |
| 2017/0317315 A1* | 11/2017 | Yang | H01L 27/322 |

FOREIGN PATENT DOCUMENTS

| | | |
|---|---|---|
| KR | 10-2015-0002033 | 1/2015 |
| KR | 10-2015-0143715 | 12/2015 |
| KR | 10-1574024 | 12/2015 |
| KR | 10-2016-0096047 | 8/2016 |
| KR | 10-2016-0116118 | 10/2016 |
| KR | 10-2017-0012696 | 2/2017 |
| KR | 20-0484125 | 8/2017 |
| KR | 10-2017-0113762 | 10/2017 |
| KR | 10-2017-0124438 | 11/2017 |
| KR | 10-2018-0061484 | 6/2018 |
| KR | 10-2018-0061485 | 6/2018 |

* cited by examiner

FLEXIBLE DISPLAY DEVICE

CROSS-REFERENCE TO RELATED APPLICATION

This patent application claims priority to and the benefit of Korean Patent Application No. 10-2017-0119762, filed on Sep. 18, 2017, the entire content of which is hereby incorporated by reference.

BACKGROUND

The present disclosure herein relates to a flexible display device, and more particularly, to a flexible display including a plurality of adhesive layers that block ultraviolet light.

Various display devices used in multimedia devices, such as televisions, mobile phones, tablet computers, navigation systems, gaming devices, and/or the like, are being developed. While such display devices are in use, external light is provided to display panels inside the display devices, and causes heat- or light-induced damage to the display panels.

Accordingly, there is a demand for research to increase the optical reliability of display panels by blocking ultraviolet light, as well as a portion of visible light, provided from the outside.

SUMMARY

An object of the present disclosure is directed toward a flexible display device in which a plurality of adhesive layers are used to block ultraviolet light, thereby mitigating quality degradation of the display device that is caused by ultraviolet light.

Another object of the present disclosure is directed toward a flexible display device in which ultraviolet absorbing agents are included in a plurality of adhesive layers to improve reliability against ultraviolet light while maintaining folding properties.

An embodiment of the inventive concept provides a flexible display device including a bending region and a non-bending region, the flexible display device including: a display panel; a polarizing member disposed on the display panel and including an optical layer, a polarizer disposed on the optical layer, and one or more inner adhesive layers disposed between the optical layer and the polarizer; a window member disposed on the polarizing member; a first outer adhesive layer disposed between the display panel and the polarizing member; and a second outer adhesive layer disposed between the polarizing member and the window member, wherein each of at least two adhesive layers among the one or more inner adhesive layers, the first outer adhesive layer, and the second outer adhesive layer includes an ultraviolet absorbing agent.

In an embodiment, when the transmittance of the polarizing member is T1, the transmittance of the first outer adhesive layer is T2, and the transmittance of the second outer adhesive layer is T3, $T1 \times T2 \times T3 \leq 6\%$ may be satisfied in the wavelength region of about 310 nm to about 410 nm.

In an embodiment, when the transmittance of the polarizing member is T1, the transmittance of the first outer adhesive layer is T2, and the transmittance of the second outer adhesive layer is T3, $T1 \times T2 \times T3 \leq 5\%$ may be satisfied in the wavelength region of about 310 nm to about 380 nm.

In an embodiment, the optical layer may include a $\lambda/4$ retardation layer; the one or more inner adhesive layers may include a first inner adhesive layer that is disposed between the $\lambda/4$ retardation layer and the polarizer; and the first inner adhesive layer may include the ultraviolet absorbing agent.

In an embodiment, the optical layer may include a $\lambda/4$ retardation layer and a $\lambda/2$ retardation layer disposed between the $\lambda/4$ retardation layer the and the polarizer; the one or more inner adhesive layers may include a first inner adhesive layer disposed between the $\lambda/4$ retardation layer and the $\lambda/2$ retardation layer, and a second inner adhesive layer disposed between the $\lambda/2$ retardation layer and the polarizer; and at least one among the first inner adhesive layer and the second inner adhesive layer may include the ultraviolet absorbing agent.

In an embodiment, the optical layer may include a $\lambda/4$ retardation layer and a positive C-plate layer disposed between the $\lambda/4$ retardation layer and the first outer adhesive layer; the one or more inner adhesive layers may include a first inner adhesive layer disposed between the $\lambda/4$ retardation layer and the polarizer, and a second inner adhesive layer disposed between the positive C-plate layer and the $\lambda/4$ retardation layer; and at least one among the first inner adhesive layer and the second inner adhesive layer may include the ultraviolet absorbing agent.

In an embodiment, the ultraviolet absorbing agent may include at least one of benzotriazole-based, benzophenone-based, salicylic acid-based, salicylate-based, cyanoacrylate-based, cinnamate-based, oxanilide-based, polystyrene-based, polyferrocenylsilane-based, methine-based, azomethine-based, triazine-based, para-aminobenzoic acid-based, cinnamic acid-based, or urocanic acid-based light absorbing dyes, or combinations thereof.

In an embodiment, the storage modulus at room temperature (25° C.) of each of the one or more inner adhesive layers, the first outer adhesive layer, and the second outer adhesive layer may be $1.0 \times 10^3$ Pa or more to $6.0 \times 10^5$ Pa or less (e.g., about $1.0 \times 10^3$ Pa to about $6.0 \times 10^5$ Pa).

In an embodiment, the storage modulus at −40° C. of each of the one or more inner adhesive layers, the first outer adhesive layer, and the second outer adhesive layer may be $1.0 \times 10^5$ Pa or more to $5.0 \times 10^7$ Pa or less (e.g., about $1.0 \times 10^5$ Pa to about $5.0 \times 10^7$ Pa).

In an embodiment, the thickness of the one or more inner adhesive layers may be 5 μm or greater to 30 μm or less (about 5 μm to about 30 μm).

In an embodiment, the thickness of each of the first outer adhesive layer and the second outer adhesive layer may be 5 μm or greater to 100 μm or less (about 5 μm to about 100 μm).

In an embodiment, at least one among the one or more inner adhesive layers, the first outer adhesive layer, and the second outer adhesive layer may further include a moisture scavenger and/or a moisture blocker.

In an embodiment, an input sensing unit disposed on the display panel may be further included, wherein the input sensing unit is disposed on a top face or bottom face of the polarizing member.

In an embodiment, a third outer adhesive layer disposed on the top face or bottom face of the input sensing unit may be further included, wherein, when the transmittance of the polarizing member is T1, the transmittance of the first outer adhesive layer is T2, the transmittance of the second outer adhesive layer is T3, and the transmittance of the third outer adhesive layer is T4, $T1 \times T2 \times T3 \times T4 \leq 6\%$ may be satisfied in the wavelength region of about 310 to about 410 nm.

In an embodiment, the display panel, the polarizing member, and the window member may be bent along a bending axis in a first mode and not bent in a second mode, the window member being positioned closer than the display panel is to the bending axis in the first mode.

In an embodiment, the display panel, the polarizing member, and the window member may be bent along a bending axis in a third mode and not bent in a fourth mode, the display panel being positioned closer than the window member is to the bending axis in the third mode.

In an embodiment, the bending region may have a radius of curvature of at most 5 mm.

In an embodiment of the inventive concept, a flexible display device includes: a display panel including a bending region and a non-bending region; a polarizing member disposed on the display panel and including a polarizer and an optical layer disposed below the polarizer; a window member disposed on the polarizing member; and a plurality of adhesive layers disposed between the display panel and polarizing member, between the polarizing member and window member, and between the polarizer and optical layer, wherein each of two or more of the adhesive layers includes an ultraviolet absorbing agent.

In an embodiment, when the transmittance of the polarizing member is Tp, and the transmittance of the adhesive layers is Ta, Tp×Ta≤6% may be satisfied in the wavelength region of about 310 nm to about 410 nm.

In an embodiment of the inventive concept, a flexible display device includes: a display panel including a bending region, the bending region having a shape that is bent along a bending axis that extends in a certain direction, or being bendable along said bending axis; a polarizing member disposed on the display panel and including an optical layer, a polarizer disposed on the optical layer, and one or more inner adhesive layers disposed between the optical layer and the polarizer; and one or more outer adhesive layers disposed on a top face or bottom face of the polarizing member, wherein each of at least two among the one or more inner adhesive layers and the one or more outer adhesive layers includes an ultraviolet absorbing agent.

DETAILED DESCRIPTION

Figure 1:
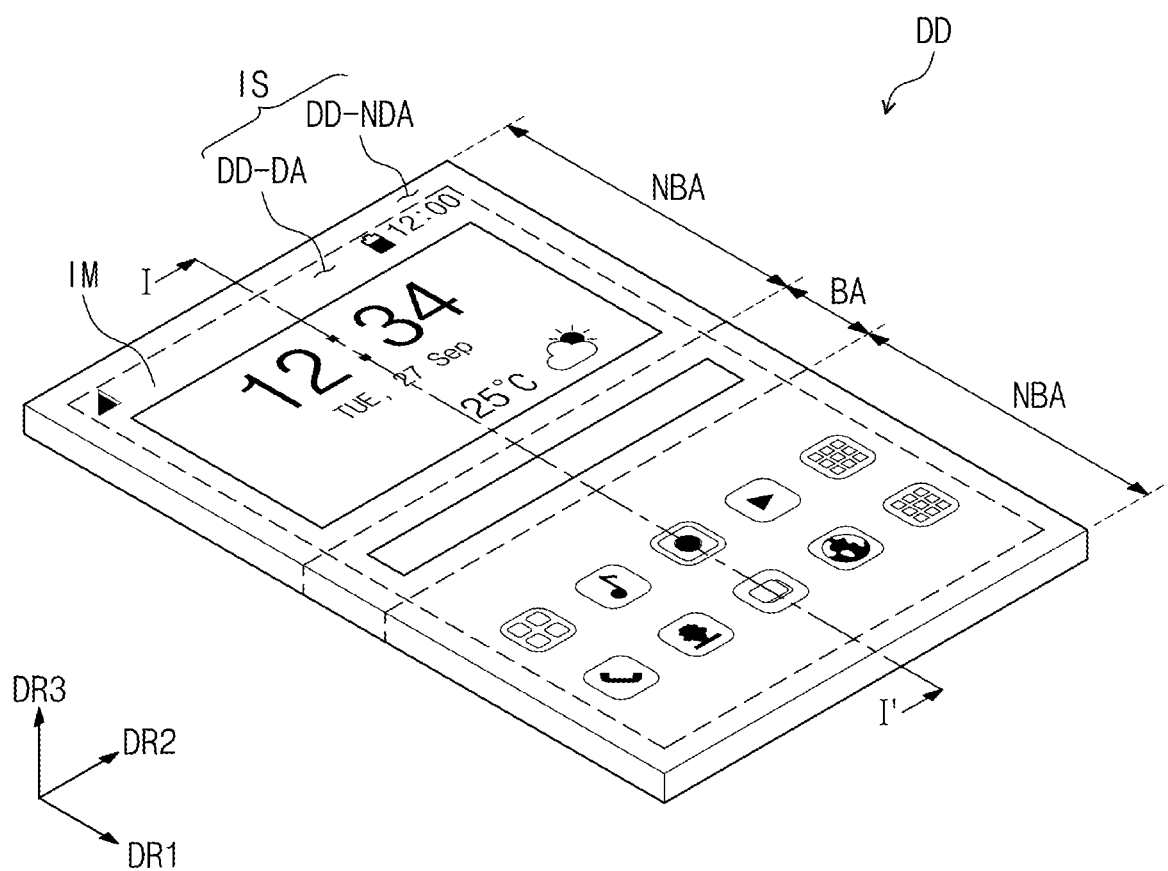
FIG. 1 is a perspective view of a flexible display device of an embodiment.

The inventive concept may be modified in various ways and embodied in various forms, and specific embodiments will be described below in more detail with reference to the accompanying drawings. However, the inventive concept should not be construed as being limited to the specific forms disclosed herein, and is to be understood as including all modifications, equivalent forms, and substitutes within the concepts and technical scope of the inventive concept.

In describing the figures, like reference numerals have been used to refer to like elements. In the accompanying drawings, the dimensions of elements are exaggerated for clarity of illustration. It will be understood that, although the terms first, second, etc. may be used to describe various elements, these elements should not be limited by these terms. These terms are only used to distinguish one element from another element. For example, without departing from the teachings of the inventive concept, a first element may be termed a second element, and similarly, a second element may also be termed a first element. As used herein, singular forms are intended to include their plural forms as well, unless the context clearly indicates otherwise.

It will be understood that the terms "includes" "has", or the like, when used in this specification, specify the presence of stated features, integers, steps, operations, elements, components, and/or combinations thereof, and do not preclude the presence or addition of one or more other features, integers, steps, operations, elements, components, and/or combinations thereof.

It will be understood that in this specification, when a part, such as a layer, film, region, plate, or the like, is "on" or "above" another part, it can be "directly on" the other part, or intervening parts may be present. Moreover, when a part, such as a layer, film, region, plate, or the like, is "under" or "below" another part, it can be "directly under" the other part, or intervening parts may be present. Furthermore, in this specification, when one element is described as being "on" another element, this not only includes cases in which the one element is "on" the other element, but also includes cases in which the one element is "under" the other element.

As used herein, the term "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Further, the use of "may" when describing embodiments of the present invention refers to "one or more embodiments of the present invention."

Hereinafter, a flexible display device according to an embodiment of the inventive concept is described with reference to the drawings.

Figure 2:
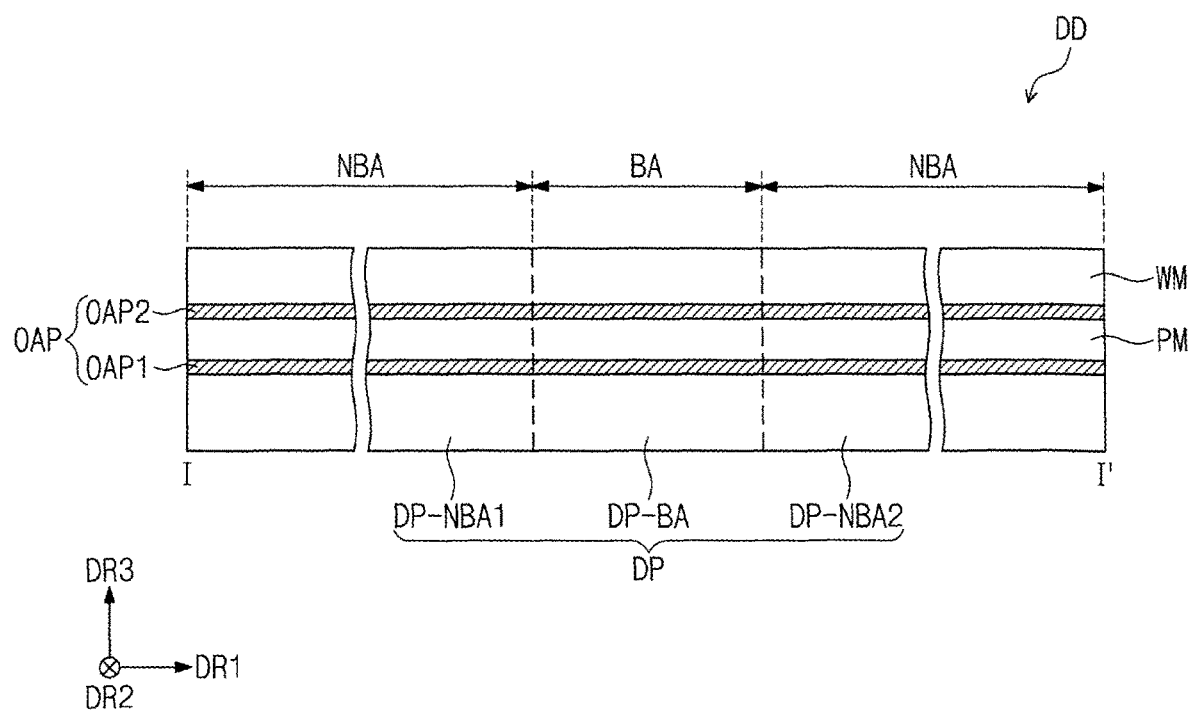
FIG. 2 is a cross-sectional view along I-I' in FIG. 1.

FIG. 1 is a perspective view of a flexible display device DD according to an embodiment. FIG. 2 schematically illustrates a cross-section corresponding to I-I' in FIG. 1.

FIG. 1 is a schematic perspective view of a flexible display device DD of an embodiment in an unbent state. Meanwhile, each of FIGS. 3A and 4A is a perspective view of a flexible display device DD of an embodiment illustrated in FIG. 1, wherein the flexible display device DD is in a folded state.

Figure 3A:
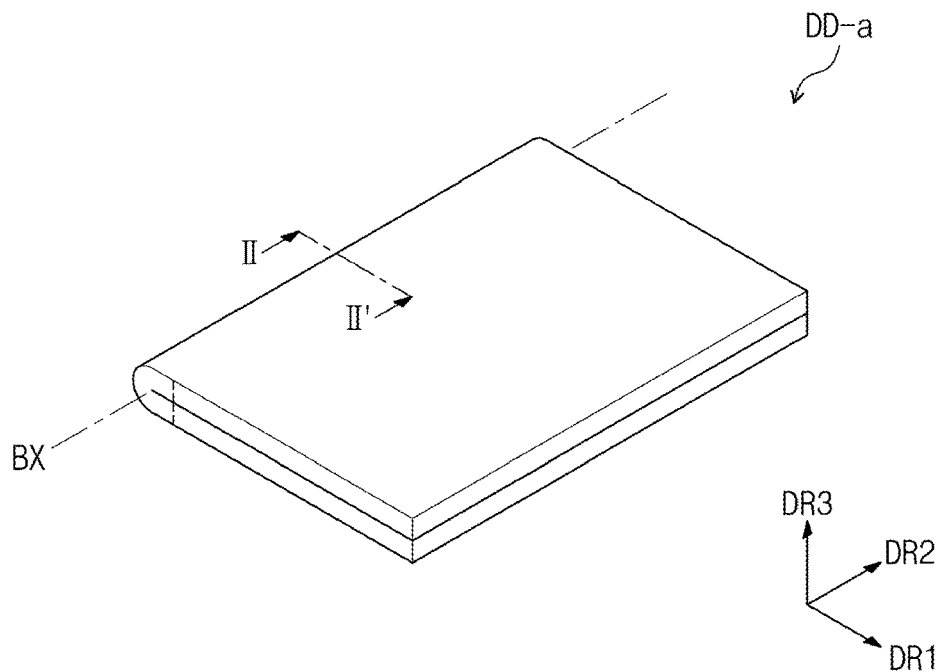
FIG. 3A is a perspective view of a flexible display device of an embodiment in a bent state.
Figure 4A:
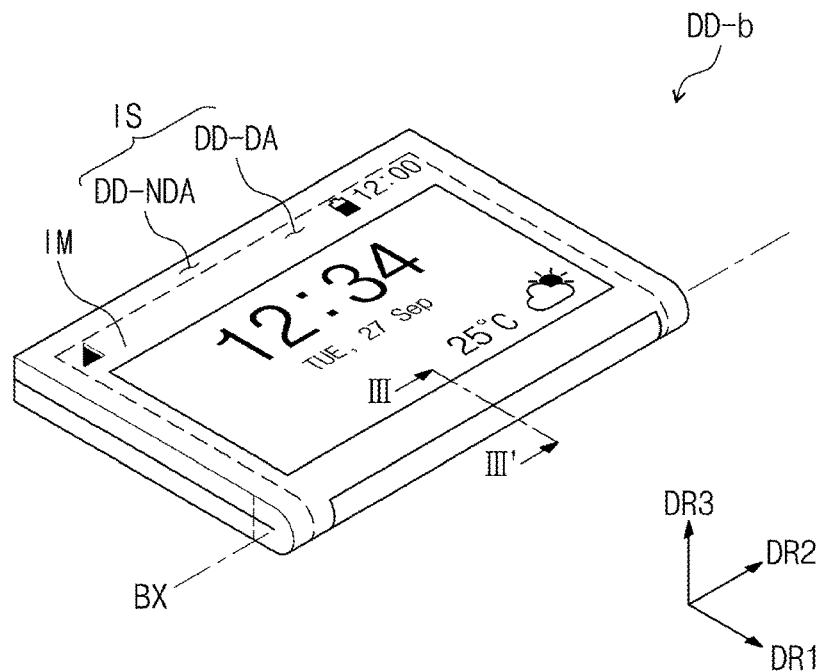
FIG. 4A is a perspective view of a flexible display device of an embodiment in a bent state.

FIGS. 1, 3A, and 4A illustrate foldable display devices as examples of a flexible display device DD of an embodiment. However, a flexible display device DD of an embodiment is not limited to the illustrated forms, and may include display devices including portions that can be bent by a tensile force or a compressive force.

Referring to FIG. 1, in a flexible display device DD of an embodiment, a display surface IS on which an image IM is displayed may be parallel with a plane defined by a first directional axis DR1 and a second directional axis DR2. The normal direction of the display surface IS, that is, the thickness direction of the flexible display device DD is indicated by a third directional axis DR3. The front face (or top face) and rear face (bottom face) of each of the members are differentiated by or separated along the third directional axis DR3. However, the directions indicated by the first to third directional axes DR1, DR2, and DR3 are relative concepts and thus may be converted into other directions. Hereinafter, first to third directions are referred to by the same figure numbers as those indicating the first to third directional axes DR1, DR2, and DR3, respectively.

The flexible display device DD of an embodiment may include a plurality of regions defined according to operation mode. The flexible display device DD of an embodiment may include a bending region BA that bends on the basis of a bending axis BX (FIGS. 3A and 4A), and a non-bending region NBA. The flexible display device DD of an embodiment may include at least one bending region BA and at least one non-bending region NBA. Although FIG. 1 illustrates a case in which one bending region BA and two non-bending regions NBA are included, embodiments are not limited thereto. For example, the flexible display device DD of an embodiment may include a plurality of bending regions BA. Moreover, the flexible display device DD of an embodiment may include three or more non-bending regions NBA.

In the flexible display device DD of an embodiment, the bending region BA and the non-bending region NBA may be connected. For example, in an embodiment, non-bending regions NBA may be disposed on two opposite (both) sides (in the first directional axis DR1) of a bending region BA.

Moreover, as illustrated in FIG. 1, the display surface IS of the flexible display device DD may include a plurality of regions. The display surface IS of the flexible display device DD may include a display region DD-DA in which the image IM is displayed, and a non-display region DD-NDA adjacent to the display region DD-DA. The non-display region DD-DA is a region in which the image IM is not displayed. In FIG. 1, application icons and a clock window are shown as examples of the image IM. The display region DD-DA may be rectangular. The non-display region DD-NDA may surround the display region DD-DA. However, embodiments are not limited thereto, and the shape of the display region DD-DA and the shape of the non-display region DD-NDA may be designed relative to each other.

Referring to FIG. 2, a flexible display device DD of an embodiment may include a display panel DP, a polarizing member PM disposed on the display panel DP, and a window member WM disposed on the polarizing member PM. Moreover, the flexible display device DD of an embodiment may include a first outer adhesive layer OAP1 disposed between the display panel DP and polarizing member PM, and a second outer adhesive layer OAP2 disposed between the polarizing member PM and the window member WM.

The display panel DP may generate images and provide the generated images to the front face. The display panel DP may provide the generated images in the direction of the third directional axis DR3. For example, the display panel DP may be an organic light emitting display panel. However, embodiments are not limited thereto, and the display panel DP may be a liquid crystal display panel, a plasma display panel, an electrophoretic display panel, a microelectrochemical system display panel, an electrowetting display panel, or the like.

The display panel DP may be a flexible display panel. The display panel DP may include a flexible substrate. Herein, flexible indicates an ability to bend, is not limited to configurations that can be bent so as to be completely folded, and may include configurations that are bent on the scale of several nanometers.

Referring to FIG. 2, the display panel DP may include a display panel bending part DP-BA corresponding to a bending region BA of the flexible display device DD, and display panel non-bending parts DP-NBA1 and DP-NBA2 corresponding to non-bending regions of the flexible display device DD. The display panel bending part DP-BA and display panel non-bending parts DP-NBA may be connected. For example, the display panel non-bending parts DP-NBA1 and DP-NBA2 may include a first display panel non-bending part DP-NBA1 connected to one end of the display panel bending part DP-BA, and a second display panel non-bending part DP-NBA2 connected to the other end of the display panel bending part DP-BA.

In FIG. 2, the display panel non-bending parts DP-NBA1 and DP-NBA2 may be respectively disposed on both sides of the display panel bending part DP-BA. The display panel non-bending parts DP-NBA1 and DP-NBA2 may be positioned symmetrically with respect to the display panel bending part DP-BA. However, embodiments are not limited thereto, and the display panel non-bending parts DP-NBA1 and DP-NBA2 may be disposed on only one side of the display panel bending part DP-BA. The display panel bending part DP-BA may also be disposed between the display panel non-bending parts DP-NBA1 and DP-NBA2 so that the display panel bending part DP-BA is positioned closer to either one of the display panel non-bending parts DP-NBA1 and DP-NBA2. In addition, the surface areas of the first display panel non-bending part DP-NBA1 and the second display panel non-bending part DP-NBA2 may differ.

In the flexible display device DD of an embodiment, a polarizing member PM may be disposed on the display panel DP. The polarizing member PM may include a polarizer and an optical layer. In the polarizing member PM, the polarizer may be a linear polarizer. Moreover, the polarizing member PM may include a retardation layer or light compensation layer as the optical layer. In an embodiment, the polarizing member PM may be disposed on the top face of the display panel DP and reduce the reflectance of external light provided from outside the flexible display device DD.

The polarizing member PM may include one or more inner adhesive layers disposed between the polarizer and the optical layer. A detailed description of the polarizing member PM will be provided later.

A window member WM may be disposed on the polarizing member PM. The window member WM may protect the display panel DP, the polarizing member PM, or the like. The window member WM may be a flexible window. The window member WM may be composed of a glass material or a flexible plastic material. However, embodiments are not limited thereto, and typical window members known in the art may be used without limit.

The window member WM may have a multilayered structure. The window member WM may have a multilayered structure of layers selected from among glass substrates, plastic films, and plastic substrates. The window member WM may further include a bezel pattern.

The window member WM may further include a surface protection layer. For example, a functional protective layer, such as a hard coating layer a fingerprint-resistant layer, and/or the like, may be further included on the window member WM. Moreover, contrary to FIG. 2, the window member WM may be excluded.

A first outer adhesive layer OAP1 may be disposed between the display panel DP and the polarizing member PM. In addition, a second outer adhesive layer OAP2 may be disposed between the polarizing member PM and the window member WM. That is, the flexible display device DD may include one or more outer adhesive layers OAP disposed on the top face or bottom face of the polarizing member PM.

The flexible display device DD of an embodiment may include a plurality of adhesive layers disposed inside or outside of the polarizing member PM. The flexible display device DD of an embodiment may include the first outer adhesive layer OAP1, the second outer adhesive layer OAP2, and one or more inner adhesive layers included inside the polarizing member PM. In the flexible display device DD of an embodiment, at least two adhesive layers among the one or more inner adhesive layers, the first outer adhesive layer OAP1, and the second outer adhesive layer OAP2 may include an ultraviolet absorbing agent. Meanwhile, in an embodiment of the inventive concept, the ultraviolet absorbing agent may absorb light in the wavelength region of about 310 nm to about 410 nm. Herein, the wavelength region of light absorbed by the ultraviolet absorbing agent may include the ultraviolet region and portions of the visible light region.

A detailed description of the first outer adhesive layer OAP1, the second outer adhesive layer OAP2, and the inner adhesive layers included in the polarizing member PM will be provided later.

Hereinafter, in descriptions about FIGS. 3A to 5B, various modified embodiments and embodiments of a flexible display device are described.

A flexible display device DD of an embodiment illustrated in FIGS. 1 and 2 may be bent along a bending axis BX in a first mode and not bent in a second mode. In the first mode, a window member WM may be closer than a display panel DP to the bending axis.

Figure 3B:
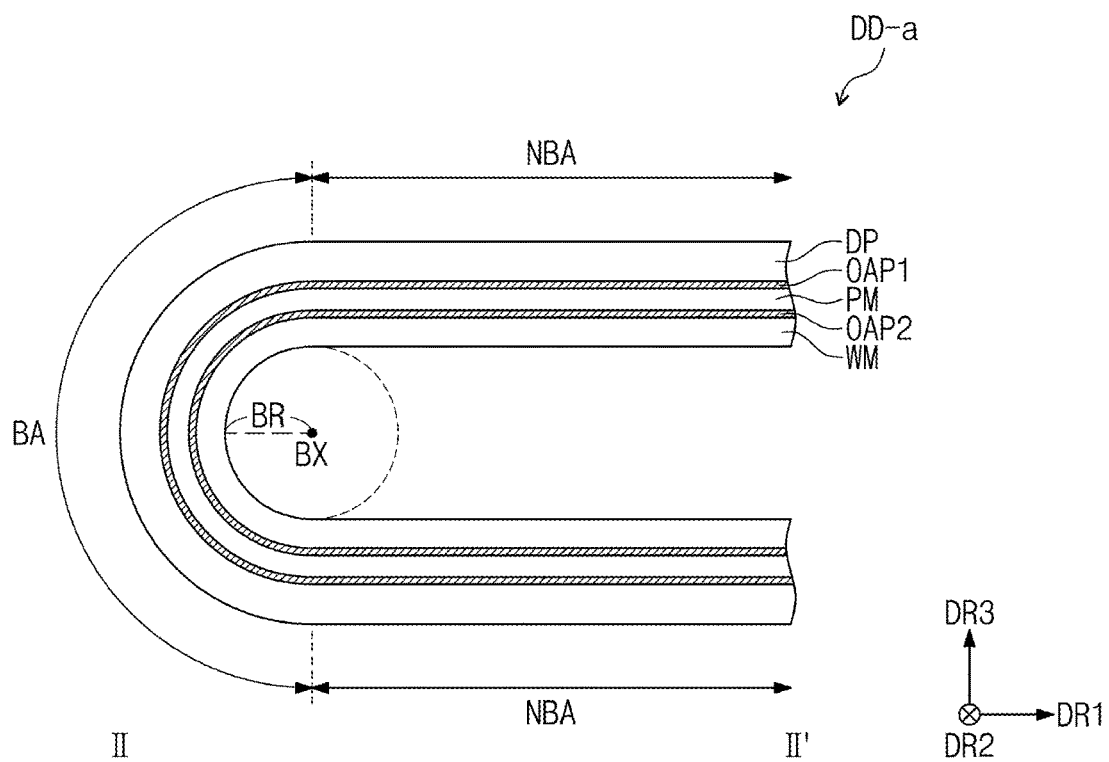
FIG. 3B is a cross-sectional view along II-II' in FIG. 3A.

FIG. 3A is a perspective view illustrating the flexible display device DD of an embodiment illustrated in FIG. 1 in a folded state, and FIG. 3B illustrates a cross section corresponding to the II-II' section in FIG. 3A. FIGS. 3A and 3B illustrate an in-folded state in which a display surface IS (FIG. 1) of the display device is on the inside. That is, FIGS. 3A and 3B are perspective views illustrating the display device that is bent in the first mode.

Moreover, a flexible display device DD of an embodiment illustrated in FIGS. 1 and 2 may be bent along a bending axis BX in a third mode, and not bent in a fourth mode. In the third mode, a display panel DP may be closer than a window member WM is to the bending axis BX.

Figure 4B:
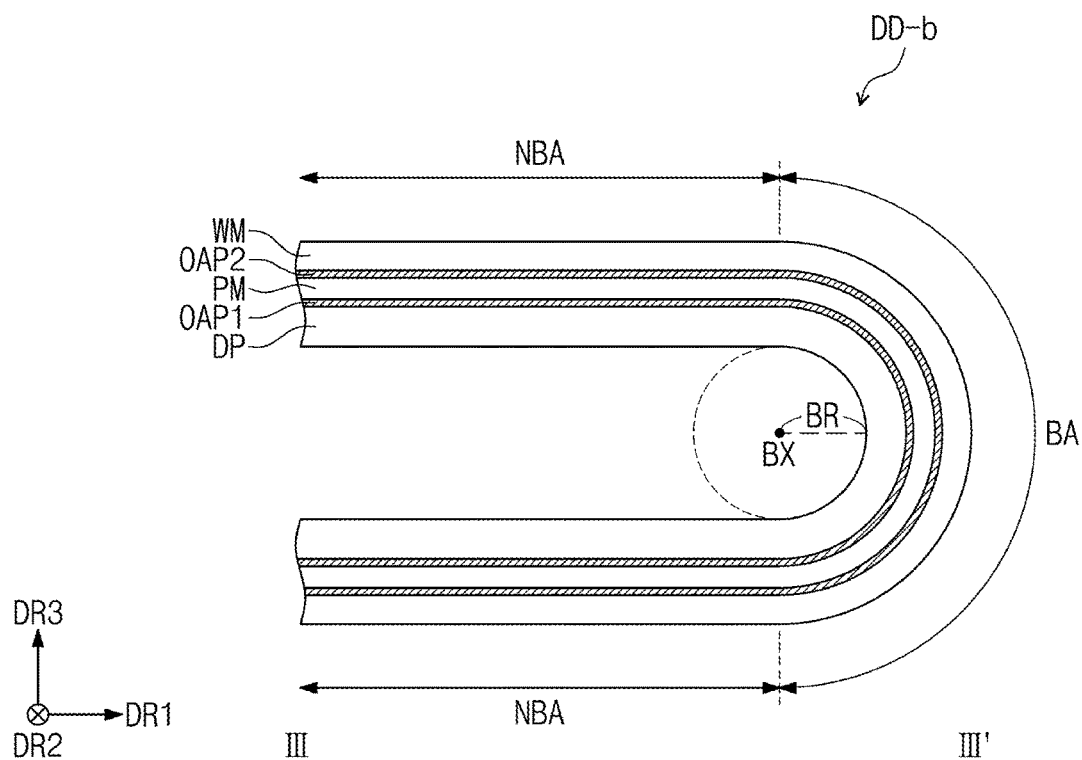
FIG. 4B is a cross-sectional view along III-III' in FIG. 4A.

FIG. 4A is a perspective view illustrating the flexible display device DD of an embodiment illustrated in FIG. 1 in a folded state, and FIG. 4B illustrates a cross section corresponding to the III-III' section in FIG. 4A. FIGS. 4A and 4B illustrate an out-folded state in which a display surface IS (FIG. 1) of the display device is exposed to the outside. That is, FIGS. 4A and 4B are perspective views illustrating the display device bent that is bent in the third mode.

In FIG. 3B or 4B, the radius of curvature of a bending region BA of the flexible display device DD-a or DD-b may be at most about 5 mm. For example, the radius of curvature BA may indicate the radius of curvature formed by the inside face of the bending region BA in a bent or folded state. Specifically, in the flexible display device DD-a or DD-b of an embodiment, the radius of curvature BR may be about 1 to about 5 mm.

In an embodiment of the inventive concept, the flexible display device DD may be configured such that only the operation modes illustrated in FIGS. 1 and 3A or FIGS. 1 and 4A are repeated. However, embodiments are not limited thereto, and the bending region BA may be defined to correspond to how the flexible display device DD is being operated by a user. Moreover, the surface area of the bending region BA is not fixed, and may be determined according to the radius of curvature BR.

Referring to FIGS. 1 to 4B, the flexible display device DD of an embodiment may include: a display panel DP including a bending region BA, the bending region BA having a shape that is bent along a bending axis BX that extends in a certain direction, or being bendable along said bending axis BX; a polarizing member PM disposed on the display panel DP; and a window member WM disposed on the polarizing member PM. Moreover, an outer adhesive layer OAP may be included in the top face and bottom face of the polarizing member PM, and, in an embodiment, one or more inner adhesive layers may be included inside the polarizing member PM.

Although in FIGS. 1 and 3B, the direction of extension of the bending axis BX is illustrated as being the direction of extension of a second directional axis DR2, embodiments are not limited thereto. For example, the direction of extension of the bending axis BX may vary according to how the flexible display device DD is deformed.

Figure 5A:
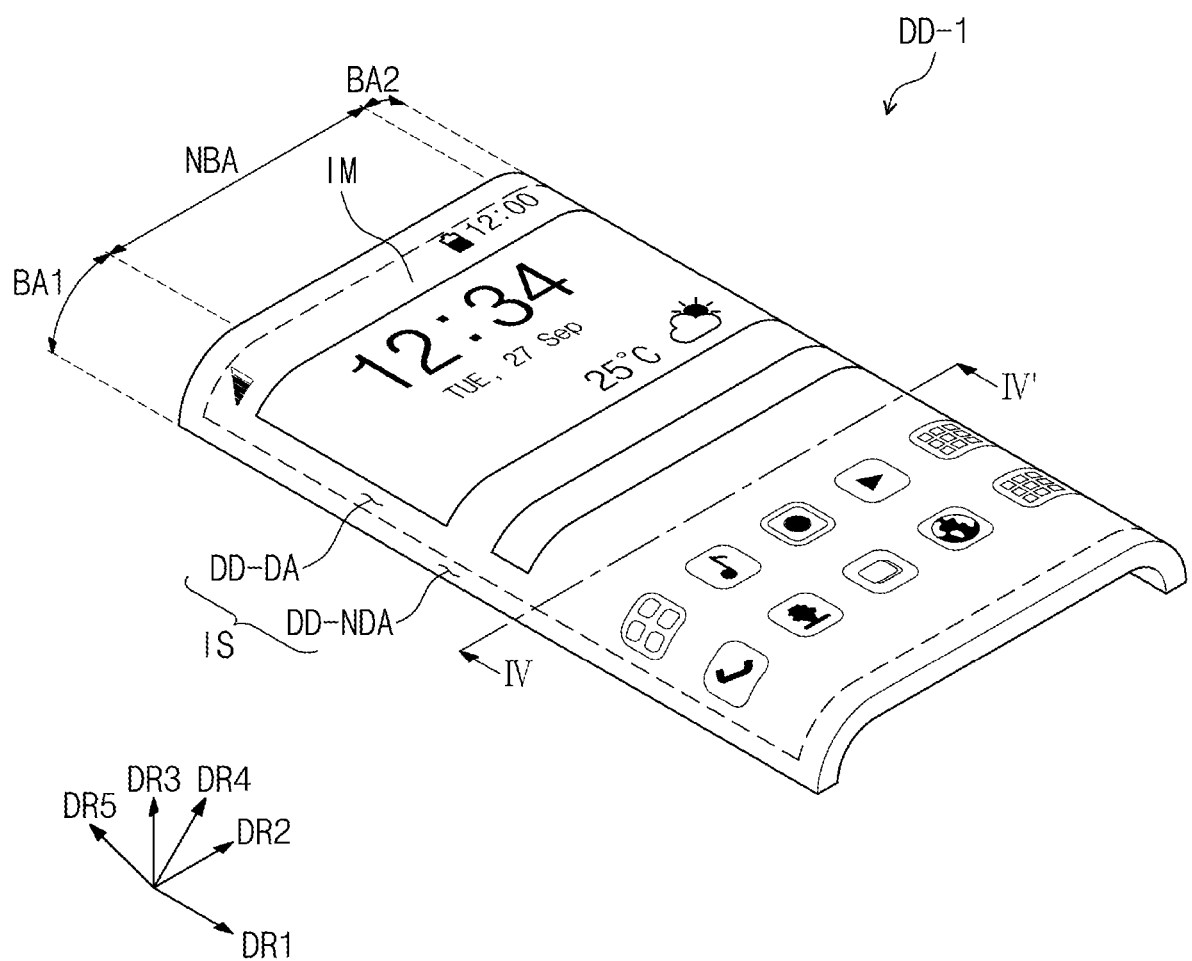
FIG. 5A is a perspective view of a flexible display device of an embodiment.
Figure 5B:
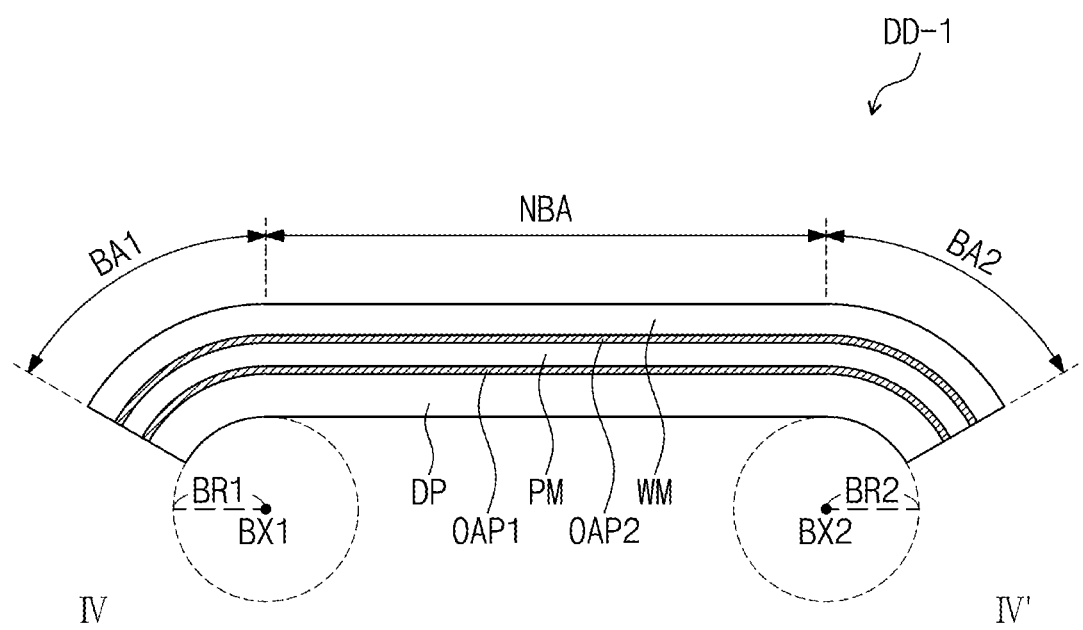
FIG. 5B is a cross-sectional view along IV-IV' in FIG. 5A.
Figure 5B:
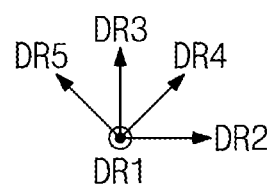

FIG. 5A is a perspective view of a flexible display device according to an embodiment. FIG. 5B is a cross-sectional view along IV-IV' in FIG. 5A. In describing the flexible display device DD-1 of an embodiment illustrated in FIGS. 5A and 5B, descriptions that overlap with the description provided for FIGS. 1 to 4B are not repeated. Rather, the focus of the description will be on the differences.

The flexible display device DD-1 of an embodiment illustrated in FIGS. 5A and 5B may include a display panel DP, a polarizing member PM, a window member WM, a first outer adhesive layer OAP1 disposed between the display panel DP and the polarizing member PM, and a second outer adhesive layer OAP2 disposed between the polarizing member PM and the window member WM.

The flexible display device DD-1 of an embodiment may include a plurality of adhesive layers that are disposed inside of the polarizing member PM or outside of the polarizing member PM. The flexible display device DD-1 may include the first outer adhesive layer OAP1 and second outer adhesive layer OAP2, which are disposed on the top face or bottom face of the polarizing member PM, and one or more inner adhesive layers, which are included inside the polarizing member PM. In the flexible display device DD-1 of an embodiment, at least two adhesive layers among the one or more inner adhesive layers, the first outer adhesive layer OAP1, and the second outer adhesive layer OAP2 may include an ultraviolet absorbing agent.

The flexible display device DD-1 of an embodiment may include bending regions BA1 and BA2, and a non-bending region NBA, and the bending regions BA1 and BA2 may be bent from a side of the non-bending region NBA.

Referring to FIGS. 5A and 5B, the flexible display device DD-1 of an embodiment may include a non-bending region NBA, in which an image IM is displayed on the front face, and first and second bending regions BA1 and BA2, in which the image IM is displayed on a side face. The first bending region BA1 and the second bending region BA2 may be respectively bent from two opposite (both) sides (in a second directional axis) of the non-bending region NBA. The first bending region BA1 and the second bending region BA2 may be sections that are bent on the basis of a first bending axis BX1 and a second bending axis BX2, respectively.

The first bending region BA1 bent on the basis of the first bending axis BX1 may have a first radius of curvature BR1, and the second bending region BA2 bent on the basis of the second bending axis BX2 may have a second radius of curvature BR2. In the flexible display device DD-1 of an embodiment, each of the first radius of curvature BR1 of the first bending region BA1 and the second radius of curvature BR2 of the second bending region BA2 may be at most about 5 mm. The first radius of curvature BR1 may be the same as the second radius of curvature BR2. Conversely, the first radius of curvature BR1 may differ from the second radius of curvature BR2.

Referring to FIGS. 5A and 5B, in the non-bending region NBA, the image IM may be provided in the direction of a third directional axis DR3, that is, the front face of the flexible display device DD-1, and the first bending region BA1 may provide images in the direction of a fifth directional axis DR5, while the second bending region BA2 may provide images in the direction of a fourth directional axis DR4. The fourth directional axis DR4 and the fifth directional axis DR5 may be oriented to intersect or cross with the first to third directional axes DR1, DR2, and DR3. However, the directions indicated by the first to fifth directional axes DR1 to DR5 are relative concepts, and thus are not limited to the directional relationships illustrated in the drawings.

The flexible display device DD-1 of an embodiment may be a bending display device including bending regions BA1 and BA2 respectively disposed on both sides of a non-bending region NBA.

Alternatively, the flexible display device of another embodiment may be a bending display device including one non-bending region and one bending region. Here, the bending region may be provided on only one side of the non-bending region.

Each of a first outer adhesive layer OAP1 and a second outer adhesive layer OAP2 included in the flexible display device of an embodiment described with reference to FIGS. 1 to 5B is illustrated as a single layer, but embodiments are not limited thereto, and each of the first outer adhesive layer OAP1 and second outer adhesive layer OAP2 may be an adhesive layer that includes multiple layers.

For example, each of the first outer adhesive layer OAP1 and second outer adhesive layer OAP2 may include a plurality of sub-adhesive layers, or include a sub-adhesive layer and a support film that supports the sub-adhesive layer.

An adhesive included in the first outer adhesive layer OAP1 and the second outer adhesive layer OAP2 may be used without limit, provided said adhesive is one that is typically used in the art. For example, the first outer adhesive layer OAP1 and second outer adhesive layer OAP2 may include urethane-based adhesive resins, fluorine-based adhesive resins, epoxy-based adhesive resins, polyester-based adhesive resins, polyimide-based adhesive resins, acrylic-based adhesive resins, silicone-based adhesive resins, or combinations thereof. For example, the first outer adhesive layer OAP1 and second outer adhesive layer OAP2 may include an acrylic-based adhesive resin and/or a silicone-based adhesive resin. Specifically, the first outer adhesive layer OAP1 and second outer adhesive layer OAP2 may include a methacrylate-based adhesive resin that includes a hydroxy group. The first outer adhesive layer OAP1 and the second outer adhesive layer OAP2 may be a methacrylate copolymer that includes a hydroxy group. Moreover, the first outer adhesive layer OAP1 and the second outer adhesive layer OAP2 may further include other monomers in addition to the methacrylate-based adhesive resin. For example, the first outer adhesive layer OAP1 and second outer adhesive layer OAP2 may include an alkyl methacrylate-based adhesive, or further include a monomer that includes an ethylene oxide group, a propylene oxide group, an amine group, an amide group, an alkoxy group, a phosphate group, a sulfate group, a phenyl group, a silane group, or the like.

Meanwhile, the adhesive resin forming the first outer adhesive layer OAP1 and second outer adhesive layer OAP2 may further include one or more additives, such as nanoparticles, initiators and/or the like.

The first outer adhesive layer OAP1 and the second outer adhesive layer OAP2 may be prepared using adhesive resins having the same composition. Conversely, the first outer adhesive layer OAP1 and second outer adhesive layer OAP2 may be prepared using adhesive resins having different compositions.

Meanwhile, the first outer adhesive layer OAP1 and second outer adhesive layer OAP2 may be optically clear adhesive layers. The first outer adhesive layer OAP1 and second outer adhesive layer OAP2 may include an optically clear adhesive (OCA) and/or optically clear resin (OCR). Specifically, the first outer adhesive layer OAP1 and second outer adhesive layer OAP2 may be optically clear adhesive layers having a transmittance of at least about 90% in the wavelength region of about 450 nm to about 750 nm.

At least one among the first outer adhesive layer OAP1 and the second outer adhesive layer OAP2 may include an ultraviolet absorbing agent. The ultraviolet absorbing agent may be a light absorbing dye that absorbs light in the wavelength region of about 310 nm to about 410 nm.

The ultraviolet absorbing agent may include at least one of benzotriazole-based, benzophenone-based, salicylic acid-based, salicylate-based, cyanoacrylate-based, cinnamate-based, oxanilide-based, polystyrene-based, polyferrocenyl-silane-based, methine-based, azomethine-based, triazine-based, para-aminobenzoic acid-based, cinnamic acid-based, or urocanic acid-based light absorbing dyes, or combinations thereof.

In an embodiment, the ultraviolet absorbing agent may include light absorbing dyes represented by Formula 1 and/or Formula 2 below.

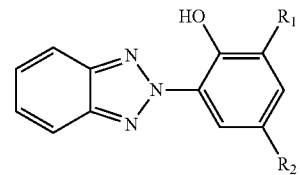

Formula 1

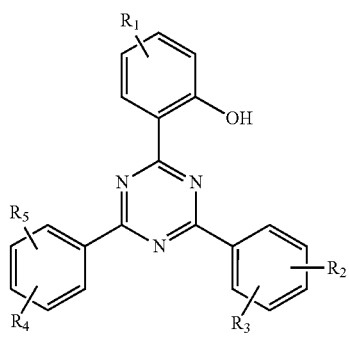

Formula 2

In Formulas 1 and 2, $R_1$ to $R_5$ may each independently be a hydrogen atom, a halogen atom, an amino group, a hydroxy group, a nitro group, a cyano group, an alkoxy group, a substituted or unsubstituted alkyl group having a carbon number of 1 to 20, a substituted or unsubstituted ring-forming aryl group having a carbon number of 6 to 30, or a substituted or unsubstituted ring-forming heteroaryl group having a carbon number of 2 to 30.

Meanwhile, the ultraviolet absorbing agent may further include other light absorbing dyes in addition to the light absorbing dyes represented by Formula 1 and/or Formula 2.

When the first outer adhesive layer OAP1 and/or second outer adhesive layer OAP2 includes the ultraviolet absorbing agent, less than about 5 wt % of the ultraviolet absorbing agent may be included with respect to 100 wt % of the total weight of the adhesive resin forming the adhesive layer. For example, at least about 0.1 wt % and less than about 5 wt % of the ultraviolet absorbing agent may be included with respect to the total weight of the adhesive resin forming the adhesive layer. Specifically, at least about 0.1 wt % and less than about 3 wt % of the ultraviolet absorbing agent may be included with respect to the total weight of the adhesive resin forming the adhesive layer.

Meanwhile, when less than about 0.1 wt % of the ultraviolet absorbing agent is included, the ultraviolet-blocking rate in the outer adhesive layer including the ultraviolet absorbing agent may be insufficient. Moreover, when about 5.0 wt % or more of the ultraviolet absorbing agent is included, the modulus of the outer adhesive layer increases, and thus folding and bending reliability may not be achieved when the adhesive layer is used in a flexible display device of an embodiment configured as a foldable display device, a bending display device, or the like.

The first outer adhesive layer OAP1 and second outer adhesive layer OAP2 may be adhesive layers having a storage modulus at room temperature (25° C.) of about $1.0 \times 10^3$ Pa to about $6.0 \times 10^5$ Pa. Moreover, the storage modulus of the first outer adhesive layer OAP1 and second outer adhesive layer OAP2 may be about $1.0 \times 10^5$ Pa to about $5.0 \times 10^7$ Pa at −40° C. For example, the storage modulus of the first outer adhesive layer OAP1 and second outer adhesive layer OAP2 may be about $1.0 \times 10^4$ Pa to about $6.0 \times 10^5$ Pa at room temperature, and about $1.0 \times 10^6$ Pa to about $5.0 \times 10^7$ Pa at a low temperature of about −40° C.

In an embodiment, when the first outer adhesive layer OAP1 and the second outer adhesive layer OAP2 have a storage modulus below about $1.0 \times 10^3$ Pa at room temperature, the outer adhesive layers OAP1 and OAP2 may not exhibit sufficient adhesive strength. Moreover, when the first outer adhesive layer OAP1 and the second outer adhesive layer OAP2 have a storage modulus above about $6.0 \times 10^5$ Pa at room temperature, the outer adhesive layers OAP1 and OAP2 may be unable to absorb the bending or folding stress in the display device, and thus cracking may occur in the adhesive layer.

Furthermore, when the storage modulus of the first outer adhesive layer OAP1 and second outer adhesive layer OAP2 is below about $1.0 \times 10^5$ Pa at a low temperature (−40° C.), the outer adhesive layers OAP1 and OAP2 may not exhibit sufficient adhesive strength. In addition, when the storage modulus of the first outer adhesive layer OAP1 and second outer adhesive layer OAP2 is above about $5.0 \times 10^7$ Pa at a low temperature (−40° C.), the outer adhesive layers OAP1 and OAP2 may be unable to absorb the bending or folding stress in the display device, and thus cracking may occur in the adhesive layer.

The thickness of each of the first and second outer adhesive layers OAP1 and OAP2 may be about 5 μm to about 100 μm. For example, the thickness of each of the first and second outer adhesive layers OAP1 and OAP2 may be 15 μm or greater to 80 μm or less (e.g., about 15 μm to about 80 μm). When the thickness of the first and second outer adhesive layers OAP1 and OAP2 is less than about 5 μm, sufficient adhesive strength may not be exhibited, and when the thickness of the first and second outer adhesive layers OAP1 and OAP2 is greater than about 100 μm, the excessive thickness may cause degradation of the folding or bending properties of the flexible display device. Meanwhile, the thicknesses of the first and second outer adhesive layers OAP1 and OAP2 may be the same or different.

Figure 6A:
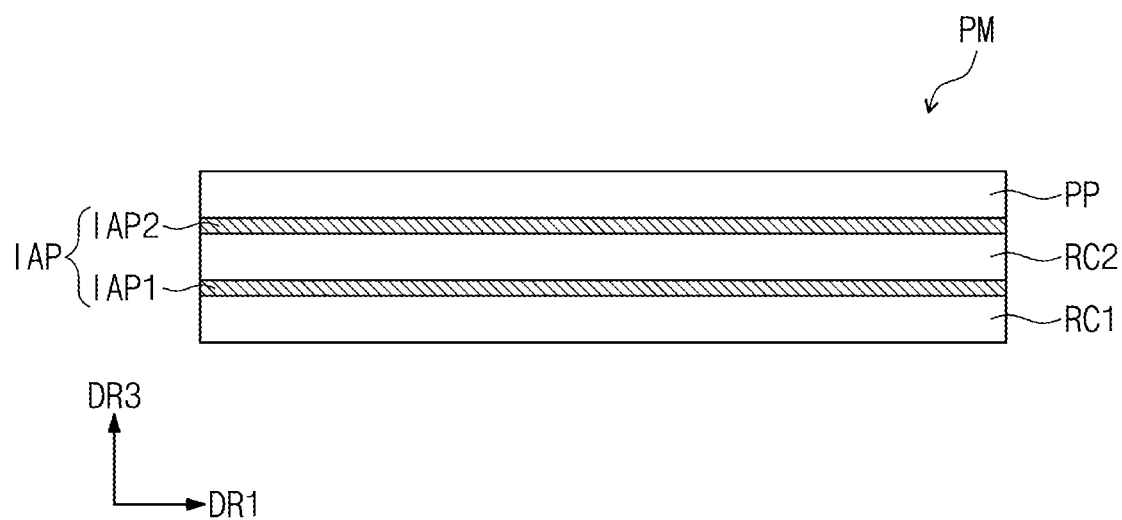
FIGS. 6A and 6B are cross-sectional views of polarizing members included in flexible display devices of certain embodiments.
Figure 6B:
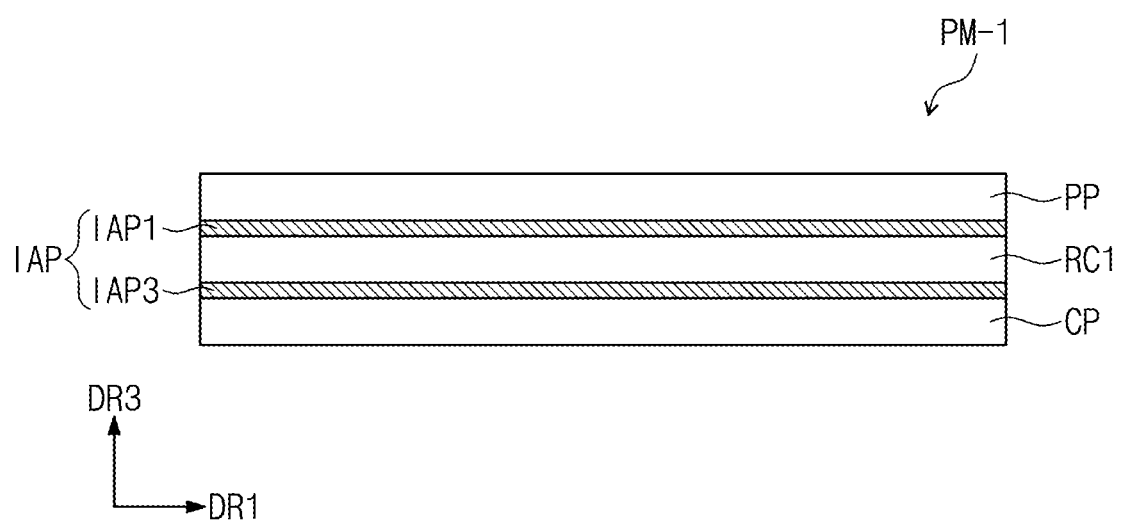

FIGS. 6A and 6B are cross-sectional views of polarizing members included in flexible display devices of certain embodiments. FIGS. 6A and 6B are each a cross-sectional view of part of a polarizing member included in a flexible display device of embodiments illustrated in FIGS. 1 to 5B.

Referring to FIG. 6A, a polarizing member PM may include a polarizer PP and optical layers RC1 and RC2 disposed below the polarizer PP.

The polarizer PP may be a linear polarizer that linearly polarizes provided light in a certain direction. The polarizer PP may be a film-type polarizer that includes a stretched polymer film. For example, the stretched polymer film may be a stretched polyvinyl alcohol-based film. Moreover, the polarizer PP may be a coating-type polarizing layer.

The polarizer PP may be prepared by adsorbing a dichroic dye onto the stretched polymer film. For example, the polarizer PP may be prepared by adsorbing iodine onto a stretched polyvinyl alcohol film. Here, the direction in which the polymer film is stretched may be the absorption axis of the polarizer PP, and a direction perpendicular to the direction of stretching may be the transmission axis of the polarizer PP.

Meanwhile, in an embodiment, the polarizer PP may further include one or more support layers. For example, an acrylic-based film and/or cyclo-olefin polymer-based film may be included as the support layer on at least one among the top face and bottom face of the polarizer PP. The support layer may be a thin substrate having a thickness of at most about 10 μm. For example, the support layer may be a polymer film having a thickness of about 5 to about 7 μm.

Meanwhile, in an embodiment, the polarizer PP may exclude a triacetyl cellulose (TAC) layer. In the case of the flexible display device of an embodiment, a polarizing member PM that includes a polarizer PP excluding a TAC layer may be used to reduce or minimize stress during folding or bending.

The optical layer of the polarizing member PM may include a λ/4 retardation layer RC1, and include a first inner adhesive layer IAP1 between the λ/4 retardation layer RC1 and the polarizer PP. The first inner adhesive layer IAP1 may include an ultraviolet absorbing agent.

Meanwhile, referring to FIG. 6A, in an embodiment, the polarizing member PM may further include a λ/2 retardation layer RC2 as the optical layer. Moreover, the polarizing member PM may further include a second inner adhesive layer IAP2 disposed between the λ/2 retardation layer RC2 and the polarizer PP. That is, in an embodiment, the polarizing member PM may include, sequentially laminated in the direction of a third directional axis DR3 which is the thickness direction of the polarizing member PM, the λ/4 retardation layer RC1, the first inner adhesive layer IAP1, the λ/2 retardation layer RC2, the second inner adhesive layer IAP2, and the polarizer PP. Meanwhile, the λ/4 retardation layer RC1 and the λ/2 retardation layer RC2 may be coating-type optical layers. For example, the λ/4 retardation layer RC1 and λ/2 retardation layer RC2 may be prepared by a process in which liquid crystal monomers, after being coated and thereby aligned, are polymerized.

In an embodiment of the polarizing member PM illustrated in FIG. 6A, at least one among the first inner adhesive layer IAP1 and second inner adhesive layer IAP2 may include an ultraviolet absorbing agent. For example, the ultraviolet absorbing agent may be included in either the first inner adhesive layer IAP1 or the second inner adhesive layer IAP2, or may be included in both the first and second inner adhesive layers IAP1 and IAP2.

Meanwhile, the polarizing member PM-1 of an embodiment illustrated in FIG. 6B may further include a positive C-plate layer CP as the optical layer. The positive C-plate layer CP may be a light compensation layer that compensates the retardation along the thickness direction of the polarizing member PM-1. That is, the positive C-plate layer CP may be an optical functional layer that compensates the retardation along the thickness direction of the λ/4 retardation layer RC1.

Moreover, the polarizing member PM-1 may further include a third inner adhesive layer IAP3 disposed between the positive C-plate layer CP and the λ/4 retardation layer RC1. That is, in an embodiment, the polarizing member PM-1 may include, sequentially laminated in the direction of the third directional axis DR3 which is the thickness direction, the positive C-plate layer CP, the third inner adhesive layer IAP3, the λ/4 retardation layer RC1, the first inner adhesive layer IAP1, and the polarizer PP.

In an embodiment of the polarizing member PM-1 illustrated in FIG. 6B, at least one among the first inner adhesive layer IAP1 and the third inner adhesive layer IAP3 may include an ultraviolet absorbing agent. For example, the ultraviolet absorbing agent may be included in either the first inner adhesive layer IAP1 or the third inner adhesive layer IAP3, or may be included in both the first and third inner adhesive layers IAP1 and IAP3.

An adhesive included in the first inner adhesive layer IAP1, the second inner adhesive layer IAP2, and/or the third inner adhesive layer IAP3 may be used without limit, provided said adhesive is typically used in the art. For example, the first to third inner adhesive layers IAP1, IAP2, and IAP3 may include at least one selected from urethane-based adhesive resins, fluorine-based adhesive resins, epoxy-based adhesive resins, polyester-based adhesive resins, polyimide-based adhesive resins, acrylic-based adhesive resins, silicone-based adhesive resins, and combinations thereof. For example, the first to third inner adhesive layers IAP1, IAP2, and IAP3 may include an acrylic-based adhesive and/or silicone-based adhesive. Specifically, the first to third inner adhesive layers IAP1, IAP2, and IAP3 may include a methacrylate-based adhesive resin that includes a hydroxy group. The first to third inner adhesive layers IAP1, IAP2, and IAP3 may be methacrylate copolymers that include a hydroxy group. Moreover, the first to third inner adhesive layers IAP1, IAP2, and IAP3 may further include other monomers in addition to the methacrylate-based adhesive resin. For example, the first to third inner adhesive layers IAP1, IAP2, and IAP3 may include an alkyl methacrylate-based adhesive, or further include a monomer that includes an ethylene oxide group, a propylene oxide group, an amine group, an amide group, an alkoxy group, a phosphate group, a sulfate group, a phenyl group, a silane group, or the like. Meanwhile, the adhesive resin forming the first to third inner adhesive layers IAP1, IAP2, and IAP3 may further include additives, such as one or more nanoparticles, initiators and/or the like.

The first to third inner adhesive layers IAP1, IAP2, and IAP3 may be prepared using adhesive resins having the same composition. Conversely, the first to third inner adhesive layers IAP1, IAP2, and IAP3 may be prepared using adhesive resins having different compositions.

Meanwhile, the first to third inner adhesive layers IAP1, IAP2, and IAP3 may be optically clear adhesive layers. The first to third inner adhesive layers IAP1, IAP2, and IAP3 may include an optically clear adhesive (OCA) and/or optically clear resin (OCR). Specifically, the first to third inner adhesive layers IAP1, IAP2, and IAP3 may be optically clear adhesive layers having a transmittance of at least about 90% in the wavelength region of about 450 nm to about 750 nm.

At least one among the first inner adhesive layer IAP1 and the second inner adhesive layer IAP2 may include an ultraviolet absorbing agent. Moreover, at least one among the first inner adhesive layer IAP1 and the third inner adhesive layer IAP3 may include the ultraviolet absorbing agent. The ultraviolet absorbing agent may be a light absorbing dye that absorbs light in the wavelength region of about 310 nm to about 410 nm.

The ultraviolet absorbing agent may include at least one selected from benzotriazole-based, benzophenone-based, salicylic acid-based, salicylate-based, cyanoacrylate-based, cinnamate-based, oxanilide-based, polystyrene-based, polyferrocenylsilane-based, methine-based, azomethine-based, triazine-based, para-aminobenzoic acid-based, cinnamic acid-based, urocanic acid-based light absorbing dyes, and combinations thereof.

Meanwhile, the ultraviolet absorbing agent included in the first to third inner adhesive layers IAP1, IAP2, and IAP3 may be a light absorbing dye represented by Formula 1 and/or Formula 2 above.

When the first inner adhesive layer IAP1, the second inner adhesive layer IAP2, and/or the third inner adhesive layer IAP3 includes the ultraviolet absorbing agent, less than about 5 wt % of the ultraviolet absorbing agent may be included with respect to 100 wt % of the total weight of the adhesive resin forming the adhesive layers. For example, at least about 0.1 wt % and less than about 5 wt % of the ultraviolet absorbing agent may be included with respect to the total weight of the adhesive resin forming the adhesive layer. Specifically, at least about 0.1 wt % and less than about 3 wt % of the ultraviolet absorbing agent may be included with respect to the total weight of the adhesive resin forming the adhesive layer.

Meanwhile, when less than about 0.1 wt % of the ultraviolet absorbing agent is included, the ultraviolet-blocking rate in the inner adhesive layer including the ultraviolet absorbing agent may be insufficient. Moreover, when about 5.0 wt % or more of the ultraviolet absorbing agent is included, the modulus of the inner adhesive layer increases, and thus folding and bending reliability may not be achieved when the adhesive layer is used in a flexible display device of an embodiment configured as a foldable display device, a bending display device, or the like.

The first to third inner adhesive layers IAP1, IAP2, and IAP3 may be adhesive layers having a storage modulus at room temperature (25° C.) of about $1.0 \times 10^3$ Pa to about $6.0 \times 10^5$ Pa. Moreover, the storage modulus of the first to third inner adhesive layers IAP1, IAP2, and IAP3 may be about $1.0 \times 10^5$ Pa to about $5.0 \times 10^7$ Pa at −40° C. For example, the storage modulus of the first to third inner adhesive layers IAP1, IAP2, and IAP3 may be about $1.0 \times 10^4$ Pa to about $6.0 \times 10^5$ Pa at room temperature, and about $1.0 \times 10^6$ Pa to about $5.0 \times 10^7$ Pa at a low temperature of about −40° C.

In an embodiment, when the first to third inner adhesive layers IAP1, IAP2, and IAP3 have a storage modulus below about $1.0 \times 10^3$ Pa at room temperature, the first to third inner adhesive layers IAP1, IAP2, and IAP3 may not exhibit sufficient adhesive strength. Moreover, when the first to third inner adhesive layers IAP1, IAP2, and IAP3 have a storage modulus above about $6.0 \times 10^5$ Pa at room temperature, the first to third inner adhesive layers IAP1, IAP2, and IAP3 may be unable to absorb the bending or folding stress in the display device, and thus cracking may occur in the adhesive layer.

Furthermore, when the storage modulus of the first to third inner adhesive layers IAP1, IAP2, and IAP3 is below about $1.0 \times 10^5$ Pa at a low temperature (−40° C.), the first to third inner adhesive layers IAP1, IAP2, and IAP3 may not exhibit sufficient adhesive strength. In addition, when the storage modulus of the first to third inner adhesive layers IAP1, IAP2, and IAP3 is above about $5.0 \times 10^7$ Pa at a low temperature (−40°), the first to third inner adhesive layers IAP1, IAP2, and IAP3 may be unable to absorb the bending or folding stress in the display device, and thus cracking may occur in the adhesive layer.

Meanwhile, the first to third inner adhesive layers IAP1, IAP2, and IAP3 may be optically clear adhesive layers. For example, the first to third inner adhesive layers IAP1, IAP2, and IAP3 may be optically clear adhesive layers having a transmittance of at least about 90% in the wavelength region of about 450 nm to 750 nm.

At least one among the first to third inner adhesive layers IAP1, IAP2, and IAP3 may include an ultraviolet absorbing agent. The ultraviolet absorbing agent may be a light absorbing dye that absorbs light in the wavelength region of about 310 nm to about 410 nm.

The thickness of each of the first and second inner adhesive layers IAP1 and IAP2 may be about 5 μm to about 30 μm. When the thickness of the first and second inner adhesive layers IAP1 and IAP2 is less than about 5 μm, sufficient adhesive strength may not be exhibited, and when the thickness of the first and second inner adhesive layers IAP1 and IAP2 is greater than about 30 μm, the excessive thickness may cause degradation in the folding or bending properties of the flexible display device.

Figure 7:
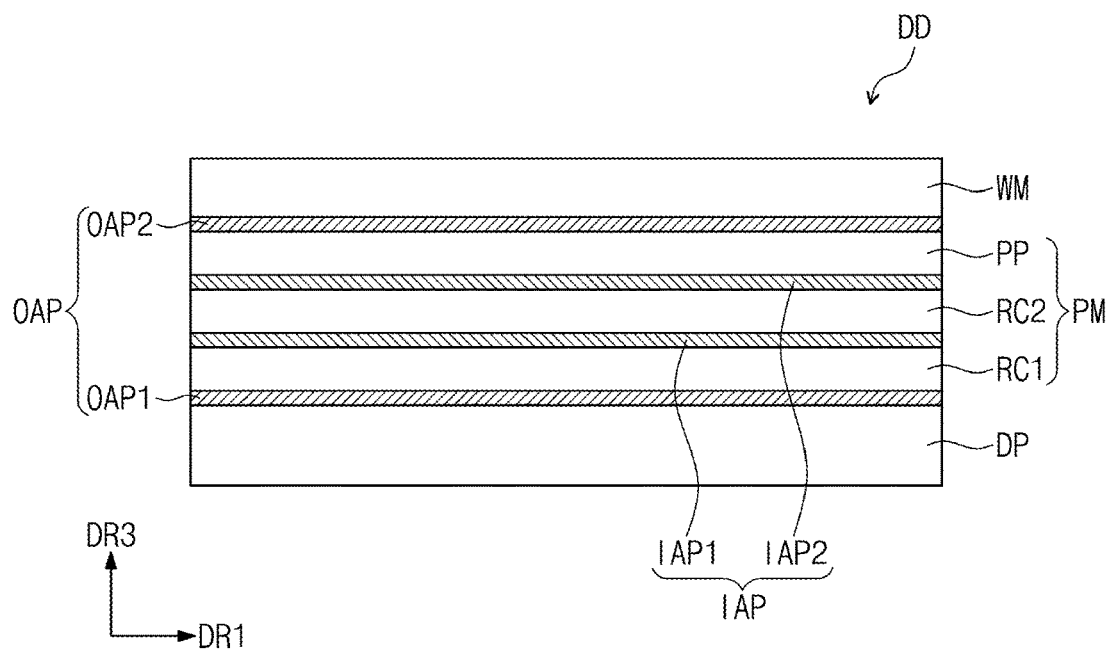
FIG. 7 is a cross-sectional view of a flexible display device of an embodiment.

FIG. 7 is a cross-sectional view of a flexible display device of an embodiment. Referring to FIG. 7, the flexible display device DD of an embodiment may include a display panel DP, a polarizing member PM, and a window member WM. Moreover, the flexible display device DD of an embodiment may include an outer adhesive layer OAP disposed on the top face or bottom face of the polarizing member PM, and an inner adhesive layer IAP included inside the polarizing member PM. In the description of the flexible display device DD of an embodiment illustrated in FIG. 7, descriptions given for a display panel DP, a polarizing member PM, a window member WM, an inner adhesive layer IAP, and an outer adhesive member OAP with reference to FIGS. 1 to 6B will apply.

The flexible display device DD of an embodiment may include one or more of the outer adhesive layers OAP disposed on the top face or bottom face of the polarizing member PM, and one or more of the inner adhesive layers IAP included inside the polarizing member PM, and at least two adhesive layers among the outer adhesive layers OAP and the inner adhesive layers IAP may include an ultraviolet absorber.

The inner adhesive layers IAP may be disposed between a polarizer PP and optical layers RC1 and RC2. For example, the inner adhesive layers IAP may include a first inner adhesive layer IAP1 disposed between a λ/4 retardation layer RC1 and a λ/2 retardation layer RC2, and a second inner adhesive layer IAP2 disposed between the λ/2 retardation layer RC2 and the polarizer PP.

Moreover, the outer adhesive layers OAP may include a first outer adhesive layer OAP1 disposed between the display panel DP and the polarizing member PM, and a second outer adhesive layer OAP2 disposed between the polarizing member PM and the window member WM.

Meanwhile, in contrast to what is illustrated in FIG. 7, the λ/2 retardation layer RC2 may be excluded from the polarizing member PM. Moreover, the second inner adhesive layer IAP2 disposed between the λ/2 retardation layer RC2 and the polarizer PP may also be excluded. Here, the flexible display device of an embodiment includes two of the outer adhesive layers OAP1 and OAP2, and one of the inner adhesive layer IAP.

In addition, in contrast to what is illustrated in the drawings, the flexible display device DD of an embodiment may also include an additional outer adhesive layer. Here, the flexible display device of an embodiment includes three of the outer adhesive layers and one or more of the inner adhesive layers.

The flexible display device DD of an embodiment may include adhesive layers in numbers that vary according to configuration, and is not limited to the illustration in FIG. 7 or embodiments described above. For example, the flexible display device DD of an embodiment may include three or more of the adhesive layers.

In the flexible display device DD of an embodiment, two or more adhesive layers among the inner adhesive layers IAP and the outer adhesive layers OAP may include an ultraviolet absorbing agent.

For example, when, as illustrated in FIG. 7, the flexible display device DD includes the first and second inner adhesive layers IAP1 and IAP2, and the first and second outer adhesive layers OAP1 and OAP2, two of the adhesive layers may include the ultraviolet absorbing agent, three or more of the adhesive layers may include the ultraviolet absorbing agent, or all four of the adhesive layers may include the ultraviolet absorbing agent.

Specifically, when two of the adhesive layers include the ultraviolet absorbing agent, the first inner adhesive layer IAP1 and second inner adhesive layer IAP2 may include the ultraviolet absorbing agent, the first outer adhesive layer OAP1 and second outer adhesive layer OAP2 may include the ultraviolet absorbing agent, or one among the first and second inner adhesive layers IAP1 and IAP2 and one among the first and second outer adhesive layers OAP1 and OAP2 may include the ultraviolet absorbing agent.

Moreover, when three of the adhesive layers include the ultraviolet absorbing agent, the first inner adhesive layer IAP1 and second inner adhesive layer IAP2, and one among the first and second outer adhesive layers OAP1 and OAP2 may include the ultraviolet absorbing agent, or the first outer adhesive layer OAP1 and second outer adhesive layer OAP2, and one among the first and second inner adhesive layers IAP1 and IAP2 may include the ultraviolet absorbing agent.

When a plurality of the adhesive layers include the ultraviolet absorbing agent, the respective ultraviolet absorbing agents included in the adhesive layers may be the same or different. Moreover, the respective contents of the ultraviolet absorbing agents included in the adhesive layers may be the same or different.

In the flexible display device DD of an embodiment, at least two of the adhesive layers include the ultraviolet absorbing agent, and a plurality of the adhesive layers including the ultraviolet absorbing agent may be used to efficiently block ultraviolet light provided to the display panel. That is, in contrast to the case in which ultraviolet light is blocked by the ultraviolet absorbing agent included in only a single adhesive layer, a plurality of the adhesive layers are used to block ultraviolet light such that a small amount of the ultraviolet absorbing agent may be used in each adhesive layer, and thus degradation of adhesive properties caused by the addition of the ultraviolet absorbing agent can be prevented. Moreover, an adhesive layer suitable for flexible display devices may be achieved by including a small amount of the ultraviolet absorbing agent to prevent an increase in the modulus of the adhesive layers that is caused by the addition of additives.

In an embodiment, the adhesive layer including the ultraviolet absorbing agent may block light in the wavelength region of about 310 nm to about 410 nm. When a plurality of the adhesive layers includes the ultraviolet absorbing agent, each of the adhesive layers including the ultraviolet absorbing agent may absorb ultraviolet light of the same wavelength region. Moreover, the plurality of adhesive layers may absorb ultraviolet light while overlapping only in some wavelength regions. For example, the wavelength region of the light blocked in each adhesive layer may be different, and the wavelength region of the light that is ultimately blocked by the plurality of adhesive layers including the ultraviolet absorbing agent may be about 310 nm to 410 nm. Here, the transmittance in the blocked wavelength region may be at most about 6%.

When the transmittance in the wavelength region of about 310 nm to about 410 nm is T1 for the polarizing member PM, T2 for the first outer adhesive layer OAP1, and T3 for the second outer adhesive layer OAP2, T1×T2×T3≤6% may be satisfied. Here, at least two adhesive layers among the first outer adhesive layer OAP1, the second outer adhesive layer OAP2, and the inner adhesive layers IAP1 and IAP2 included in the polarizing member PM may include the ultraviolet absorbing agent.

The transmittances T1, T2, and T3 may be combined in various ways, and as a result of said combination, a transmittance of at most about 6% may be exhibited in the wavelength region of about 310 nm to about 410 nm. Meanwhile, the transmittance T1 of the polarizing member PM including the polarizer may be smaller than the transmittances T2 and T3 of the outer adhesive layers. For example, T1≤7% may be satisfied while T2 and T3 are less than or equal to about 90%.

Meanwhile, the adhesive layer including the ultraviolet absorbing agent may block light in the wavelength region of about 310 nm to about 380 nm. When the transmittance in the wavelength region of about 310 nm to about 380 nm is T1 for the polarizing member PM, T2 for the first outer adhesive layer OAP1, and T3 for the second outer adhesive layer OAP2, T1×T2×T3≤5% may be satisfied. Here, at least two adhesive layers among the first outer adhesive layer OAP1, the second outer adhesive layer OAP2 and the inner adhesive layers IAP1 and IAP2 included inside the polarizing member PM may include the ultraviolet absorbing agent. Moreover, the transmittances T1, T2, and T3 may be combined in various ways. T1, T2, and T3 may depend on the content of the ultraviolet absorbing agent included in the adhesive layer.

The adhesive layers included in the flexible display device DD of an embodiment may include a moisture scavenger and/or a moisture blocker. The adhesive layer including the moisture scavenger or moisture blocker may perform the role of a barrier layer. In an embodiment, the adhesive layer including the moisture scavenger and/or the moisture blocker may function as a barrier layer that blocks moisture that is being transferred to the display panel.

Moisture scavenger may indicate a material that removes moisture or humidity through chemical reactions with the moisture or humidity. Moisture blocker may indicate a material which has low or nonexistent reactivity with moisture, and can block or obstruct the transport of moisture or humidity.

A typical moisture scavenger known in the art may be used, for example, the moisture scavenger may be a metal salt, a metal oxide, a sulfate, an organic metal oxide, or the like. Specifically, examples of the sulfate may include magnesium sulfate, sodium sulfate, nickel sulfate, and/or the like, and examples of the organic metal oxide may include aluminum oxide octylate and/or the like. Specific examples of the metal oxide may include phosphorous pentoxide ($P_2O_5$), lithium oxide ($Li_2O$), sodium oxide ($Na_2O$), barium oxide (BaO), calcium oxide (CaO), magnesium oxide (MgO), and/or the like, and examples of the metal salt may include sulfates, such as lithium sulfate ($Li_2SO_4$), sodium sulfate ($Na_2SO_4$), calcium sulfate ($CaSO_4$), magnesium sulfate ($MgSO_4$), cobalt sulfate ($CoSO_4$), gallium sulfate ($Ga_2(SO_4)_3$), titanium sulfate ($Ti(SO_4)_2$), nickel sulfate ($NiSO_4$) and/or the like; metal halides, such as calcium chloride ($CaCl_2$), magnesium chloride ($MgCl_2$), strontium chloride ($SrCl_2$), yttrium chloride ($YCl_3$), copper chloride ($CuCl_2$), cesium fluoride (CsF), tantalum fluoride ($TaF_5$), niobium fluoride ($NbF_5$), lithium bromide (LiBr), calcium bromide ($CaBr2$), cesium bromide ($CeBr_3$), selenium bromide ($SeBr_4$), vanadium bromide ($VBr_3$), magnesium bromide ($MgBr_2$), barium iodide ($BaI_2$), magnesium iodide ($MgI_2$), and/or the like; and metal chlorates, such as barium perchlorate ($Ba(ClO_4)_2$), magnesium perchlorate ($Mg(ClO_4)_2$), and/or the like, but are not limited thereto.

In the flexible display device DD of an embodiment, at least one adhesive layer among the first and second outer adhesive layers OAP1 and OAP2 and first and second inner adhesive layers IAP1 and IAP2 may include the moisture scavenger. Moreover, one of those described above may be used as the moisture scavenger, or two or more thereof may be included. In one example, calcined dolomite or the like may be used when using two or more moisture scavengers.

Such moisture scavengers may be controlled to be an appropriate size according to how the moisture scavengers are used. In one example, the average particle diameter of the moisture scavenger may be controlled to be about 10 nm to 15,000 nm. In the case of the moisture scavenger in this size range, the reaction with moisture is not excessively fast, thus making storage convenient, the moisture scavenger does not damage elements that are being encapsulated, and the moisture scavenger can effectively remove moisture. Moisture scavenger content is not particularly limited, and may be appropriately selected by considering the intended scavenging properties.

In the case of the moisture blocker, one, or two or more among clay, talc, needle-like silica, plate-like silica, porous silica, zeolite, titania, and zirconia may be used. Moreover, the moisture blocker may be surface-modified by an organic modifier or the like to facilitate infiltration of organic materials. For example, dimethyl benzyl hydrogenated tallow quaternary ammonium, dimethyl dehydrogenated tallow quaternary ammonium, methyl tallow bis-2-hydroxyethyl quaternary ammonium, dimethyl hydrogenated tallow 2-ethylhexyl quaternary ammonium, dimethyl dehydrogenated tallow quaternary ammonium, one or more mixtures thereof (that are all organic modifiers), or the like may be used as such an organic modifier. Moisture blocker content is not particularly limited, and may be appropriately selected by considering the intended blocking properties.

In the flexible display device of an embodiment, at least one adhesive layer among the first and second outer adhesive layers OAP1 and OAP2 and first and second inner adhesive layers IAP1 and IAP2 may include the moisture blocker. Moreover, in an embodiment, one of those described above may be used as the moisture blocker, or two or more thereof may be included.

Figure 8:
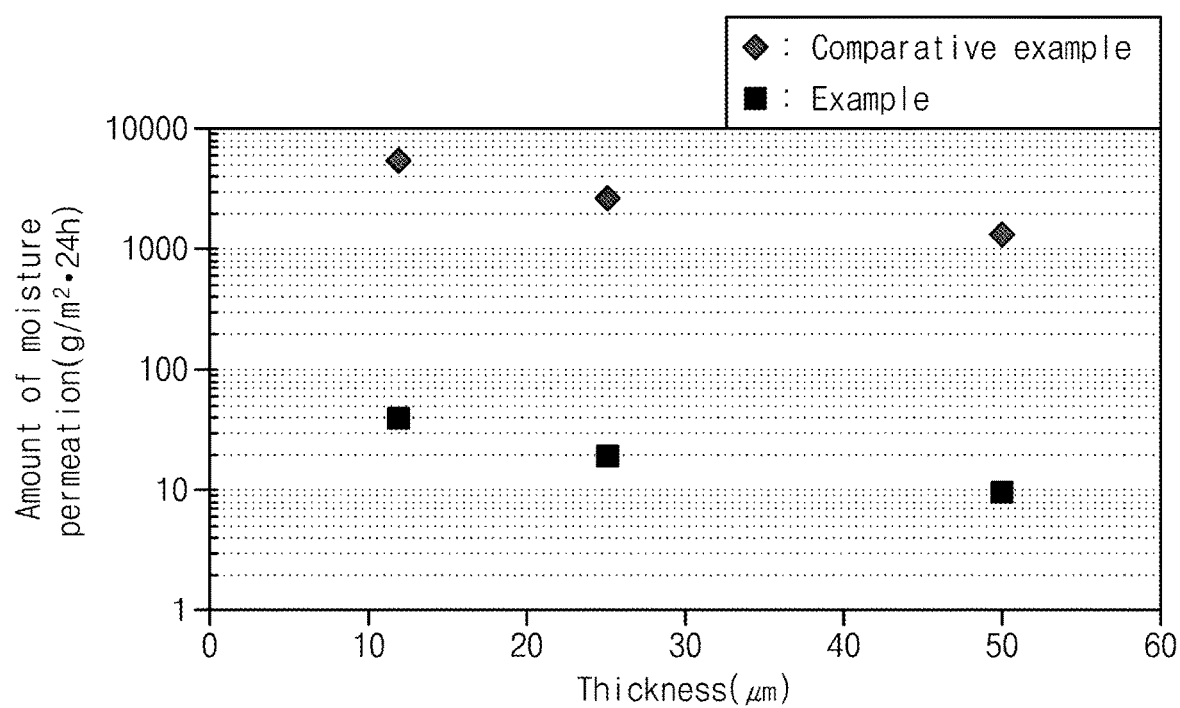
FIG. 8 shows the results of evaluating the moisture permeability of a flexible display device of an embodiment.

FIG. 8 is a graph showing the results of measuring the amount of moisture that passes through an adhesive layer including a moisture blocker. Referring to FIG. 8, it can be seen that less moisture passes through in the case of the example including the moisture blocker than in the case of the comparative example that does not include the moisture blocker. Moreover, it can be seen that the amount of moisture that passes through decreases with increased thickness of the adhesive layer. That is, by including the moisture blocker, the adhesive layer of an embodiment can effectively block moisture even when having a thin adhesive layer thickness, and thus is able to function as a barrier layer in the flexible display device.

Figure 9A:
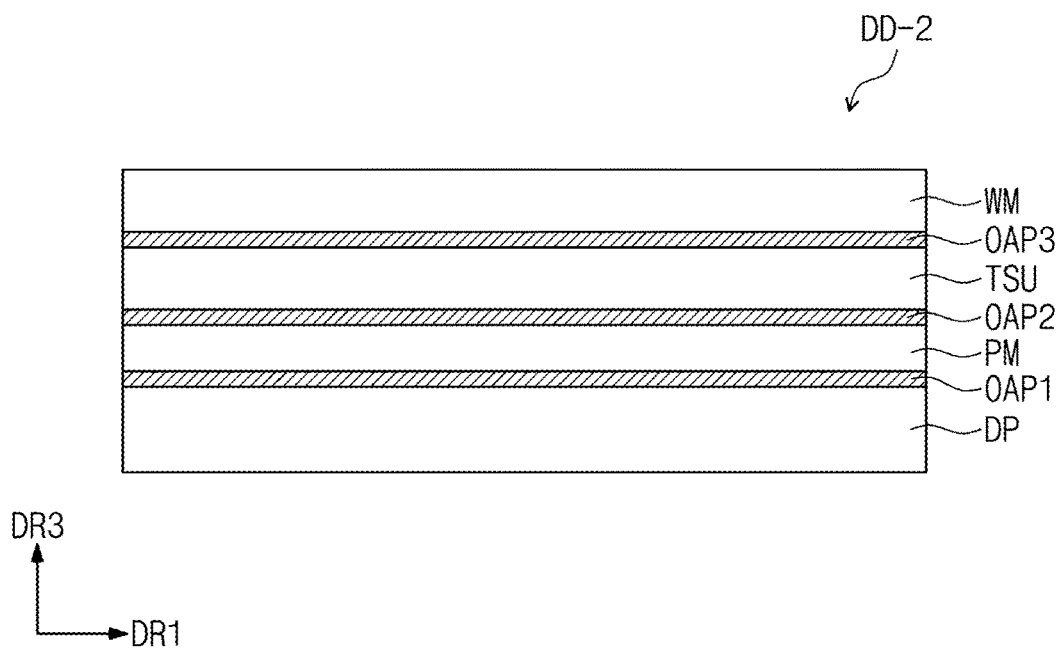
FIGS. 9A and 9B are cross-sectional views of flexible display devices of certain embodiments.
Figure 9B:
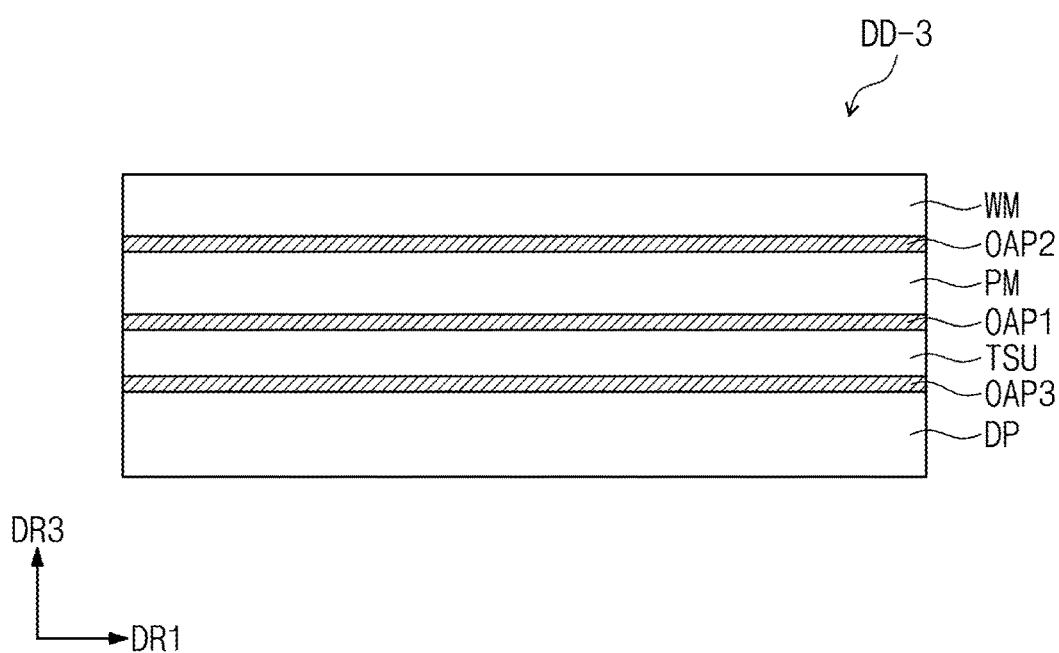

FIGS. 9A and 9B are cross-sectional views of flexible display devices of certain embodiments. Referring to FIGS. 9A and 9B, flexible display devices DD-2 and DD-3 may further include an input sensing unit TSU. The input sensing unit TSU may be disposed on a display panel DP.

In the flexible display device DD-2 of an embodiment illustrated in FIG. 9A, the input sensing unit TSU may be disposed on a polarizing member PM. Conversely, in the flexible display device DD-3 of an embodiment illustrated in FIG. 9B, the input sensing unit TSU may be disposed below the polarizing member PM.

The input sensing unit TSU may perceive a direct touch by a user, an indirect touch by a user, a direct touch by an object, and/or an indirect touch by an object. Meanwhile, the input sensing unit TSU may detect at least one among the position and force (pressure) of the externally applied touch. The input sensing unit TSU of an embodiment of the inventive concept may have various configurations or be configured using various materials, and is not limited to any single embodiment. For example, in the flexible display devices DD-2 and DD-3 of an embodiment, the input sensing unit TSU may be a touch sensing unit that detects touches.

Referring to FIGS. 9A and 9B, the flexible display devices DD-2 and DD-3 of an embodiment may further include a third outer adhesive layer OAP3 for fixing the input sensing unit TSU. The third outer adhesive layer OAP3 may be disposed on the top face or bottom face of the touch sensing unit TSU.

In FIG. 9A, the third outer adhesive layer OAP3 may be disposed on the top face of the input sensing unit TSU. The third outer adhesive layer OAP3 may be disposed between the input sensing unit TSU and the window member WM. Moreover, in FIG. 9B, the third outer adhesive layer OAP3 may be disposed on the bottom face of the input sensing unit TSU. The third outer adhesive layer OAP3 may be disposed between the display panel DP and the input sensing unit TSU.

Descriptions given above for first and second outer adhesive layers OAP1 and OAP2 apply to the third outer adhesive layer OAP3. For example, the third outer adhesive layer OAP3 may include an ultraviolet absorbing agent. Meanwhile, in an embodiment, the polarizing member PM may include one or more inner adhesive layers. For example, the polarizing member PM may have the configuration described above with reference to FIG. 6A or 6B.

In flexible display devices DD and DD-1 of an embodiment, at least two adhesive layers among one or more inner adhesive layers disposed inside a polarizing member PM, and first to third outer adhesive layers OAP1, OAP2, and OAP3 may include an ultraviolet absorbing agent. That is, two or more adhesive layers selected from among the inner adhesive layers and the first to third outer adhesive layers OAP1, OAP2, and OAP3 may include the ultraviolet absorbing agent.

Moreover, for light passing through the polarizing member PM and the first to third outer adhesive layers OAP1, OAP2, and OAP3, the transmittance may be at most about 6% in the wavelength region of about 310 nm to about 410 nm. For example, when the transmittance in the wavelength region of about 310 nm to about 410 nm is T1 for the polarizing member PM, T2 for the first outer adhesive layer OAP1, T3 for the second outer adhesive layer OAP2, and T4 for the third outer adhesive layer OAP3, $T1 \times T2 \times T3 \times T4 \leq 6\%$ may be satisfied.

Specifically, for light passing through the polarizing member PM and the first to third outer adhesive layers OAP1, OAP2, and OAP3, the transmittance may be at most about 5% in the wavelength region of about 310 nm to about 380 nm. That is, $T1 \times T2 \times T3 \times T4 \leq 5\%$ may be satisfied in the wavelength region of about 310 nm to about 380 nm.

Meanwhile, in an embodiment and in contrast to what is illustrated in FIG. 9B, the third outer adhesive layer OAP3 may be excluded. That is, the input sensing unit TSU may be directly disposed on the display panel DP without a separate adhesive member. Herein, "directly disposed" excludes cases in which attachment is achieved through the use of a separate adhesive member, and indicates that formation involved a continuous process.

Meanwhile, in an embodiment, the window member WM may further include one or more functional layers. Moreover, the one or more functional layers may include ultraviolet absorbing agents. The functional layers may include, for example, a protective layer, an anti-reflection layer, a hard coating layer, a surface treatment layer, a deco layer, and/or the like. However, types of the functional layer are not limited to those listed, and typical functional layers known in the art may be used without limit.

In the flexible display device of an embodiment described above, a plurality of the adhesive layers disposed on the display panel include ultraviolet absorbing agents. Thus, ultraviolet light may be effectively blocked by combinations of the plurality of adhesive layers including the ultraviolet absorbing agents, and thus the flexible display device may have improved reliability against light.

In the flexible display device of an embodiment, by including the ultraviolet absorbing agent in at least two adhesive layers selected from among a plurality of inner adhesive layers disposed inside a polarizing member and outer adhesive layers disposed on the top face and bottom face of the polarizing member, an ultraviolet blocking effect equal to or superior to that achieved in a flexible display device having a single adhesive layer including an ultraviolet absorbing agent may be achieved while maintaining satisfactory adhesive properties and achieving improved mechanical properties and reliability against light.

Below, Tables 1 to 3 show the results of evaluating the light resistance of a flexible display device of an embodiment.

Table 1 displays the results of evaluating the amount of change in color temperature in the flexible display device of an embodiment. In Table 1, the initial color temperature of the flexible display device is compared with the color temperature following 10 cycles of light exposure test. Here, the 10 cycles of light exposure test correspond to 10 cycles of a test in which each cycle involved irradiating a sample with ultraviolet light for 8 hours at 40° C., and then leaving the sample alone for 4 hours at 25° C.

Meanwhile, in the comparative example, an external light exposure test was carried out on samples that had been covered to prevent exposure to light. Testing was performed on three samples each of the example and comparative example.

TABLE 1

| Item | Comparative example | | | Example | | |
|---|---|---|---|---|---|---|
| | Sample 1-1 | Sample 1-2 | Sample 1-3 | Sample 2-1 | Sample 2-2 | Sample 2-3 |
| Initial color temperature (K) | 7513 | 7444 | 7623 | 7382 | 7543 | 7518 |
| Color temperature following test (K) | 7640 | 7531 | 7720 | 7504 | 7648 | 7609 |
| Change in color temperature (K) | 127 | 87 | 97 | 122 | 105 | 90 |

Referring to the results of Table 1, in both the comparative example, in which the samples had not been exposed to external light, and the example, in which the samples were exposed to external light, a small change in color temperature of 150 K was measured. That is, it can be seen that the flexible display device of an embodiment, due to including an ultraviolet absorbing agent in at least two adhesive layers, efficiently blocks 310 nm to 410 nm wavelength light, and consequently, satisfactory results are obtained in light exposure tests.

Table 2 shows the results of evaluating the perceived black reflection of the flexible display device of an embodiment. Table 2 compares the black reflectance and color coordinates of flexible display devices following 10 cycles of light exposure test. Here, the 10 cycles of light exposure test correspond to tests performed under the same conditions as described for the evaluation relating to Table 1.

Meanwhile, in the comparative example, external light exposure tests were performed on samples that were shielded from light to prevent light exposure. Reflectance and color coordinates were measured lengthwise and breadthwise for each of the example and comparative example. Meanwhile, in the reflectance measurements, SCE is the measured reflectance of diffused reflected light, while SCI is the measured reflectance including specularly reflected light. a* and b* represent the color coordinates.

TABLE 2

| Item | | Reflectance (SCE/SCI) | a*(SCE) | b*(SCE) |
|---|---|---|---|---|
| Comparative example | Length | 0.36/5.05 | −0.84 | −0.37 |
| | Breadth | 0.32/4.99 | −1.27 | −1.13 |
| Example | Length | 0.35/5.01 | −0.80 | −041 |
| | Breadth | 0.31/4.94 | −1.22 | −0.92 |

Referring to the results of Table 2, no significant difference in reflectance and color coordinate values was found between the comparative example, in which the samples had not been exposed to external light, and the example, in which the samples were exposed to external light. That is, there was almost no difference in reflectance and color coordinates between the comparative example and example, which were compared both lengthwise and breadthwise, and thus, it can be seen that the flexible display device of an embodiment exhibits reliability against light. That is, the flexible display device of an embodiment, due to including ultraviolet absorbing agents in at least two adhesive layers, efficiently blocks 310 nm to 410 nm wavelength light, and consequently, satisfactory display quality results are obtained in light exposure tests.

Table 3 shows the storage modulus of adhesive layers used in the flexible display device of an embodiment, and the results of folding tests carried out on the flexible display devices in which the respective adhesive layers were used. In Table 3, Example 1 corresponds to evaluation results obtained for a flexible display device having the configuration illustrated in FIG. 9B, while Example 2 corresponds to evaluation results obtained for a flexible display device having a configuration in which the third outer adhesive layer in FIG. 9B is excluded and the input sensing unit is directly disposed on the display panel. Adhesive layers 1 to 3 used in the tests all have the same thickness.

In the results of Table 3, "NG" indicates that cracks were generated in the polarizing member under folding test conditions, while "OK" indicates that cracks were not generated in the polarizing member under folding test conditions. That is, "NG" indicates that cracks were generated in adhesive layers included in the polarizing member such that the display quality of the flexible display device was degraded, while "OK" indicates that the display quality of the flexible display device was satisfactory.

In Table 3, G' indicates storage modulus. In the folding test, "folded" indicates that a folded state was maintained for 240 hours, while "folding" indicates test results obtained after 100,000 cycles of folding and unfolding. The folding test was performed for both in-folding and out-folding. The folding test was performed under high temperature (85° C.), room temperature (25° C.), low temperature (−40° C.), and high temperature/high humidity (60° C./93%) conditions.

TABLE 3

| Adhesive layer | G'[Pa] | | | Example 1 | | Example 2 | |
|---|---|---|---|---|---|---|---|
| | 85 | 25 | −40 | Folded | Folding | Folded | Folding |
| Adhesive layer 1 | $1.8 \times 10^5$ | $6.6 \times 10^5$ | $5.3 \times 10^7$ | Low temperature NG | Low temperature NG | NG | NG |
| Adhesive layer 2 | $5.8 \times 10^4$ | $3.8 \times 10^5$ | $9.8 \times 10^6$ | OK | OK | NG at Low temperature | NG at Low temperature |
| Adhesive layer 3 | $5.3 \times 10^4$ | $8.1 \times 10^4$ | $5.2 \times 10^6$ | OK | OK | OK | OK |

Referring to the results of Table 3, it was observed that test results for the flexible display device under reliability test conditions improved with decreased storage modulus in the adhesive layer. When adhesive layer 1 having a storage modulus greater than $6.0 \times 10^5$ Pa at room temperature was used, defects were observed to occur under low temperature test conditions. Moreover, when adhesive layer 2 having a storage modulus greater than $1.0 \times 10^5$ Pa at room temperature was used, the display device of Example 1 achieved satisfactory test results for all of the reliability conditions, but defects were observed to occur under low temperature test conditions in the display device of Example 2. Thus, folding reliability can be achieved in the flexible display device of an embodiment through the use of an adhesive layer having a storage modulus of at most $6.0 \times 10^5$ Pa at room temperature. Moreover, an adhesive layer having a storage modulus of at most $1.0 \times 10^5$ Pa can be used to achieve folding reliability in the flexible display device of an embodiment.

Meanwhile, as the storage modulus of the adhesive layer decreases, the adhesive layer absorbs more folding stress, and thus folding reliability results are satisfactory, but when the storage modulus at room temperature is less than $1.0 \times 10^3$ Pa, sufficient adhesive strength may not be exhibited.

Moreover, the storage modulus of the adhesive layer is desirably at most $5.0 \times 10^7$ Pa under low temperature conditions of −40° C. In addition, specifically, the storage modulus of an adhesive layer in an embodiment is desirably at most $9.0 \times 10^6$ Pa under −40° C. conditions.

Meanwhile, as the low temperature storage modulus of the adhesive layer decreases, the adhesive layer absorbs more folding stress, and thus folding reliability results are satisfactory, but when the storage modulus at low temperature is less than $1.0 \times 10^5$ Pa, sufficient adhesive strength may not be exhibited.

In an embodiment, a flexible display device having both improved folding flexibility and improved reliability against light was achieved by ensuring that ultraviolet light is dispersed and thereby absorbed in a plurality of adhesive layers, such that a low ultimate ultraviolet-blocking rate of at most about 6% is maintained and the adhesive layers are sufficiently flexible.

A flexible display device of an embodiment includes ultraviolet absorbing agents in a plurality of adhesive layers, and thus effectively blocks the ultraviolet light that is ultimately provided to a display panel. Moreover, since each of the adhesive layers includes only small amounts of the ultraviolet absorbing agents, degradation of the mechanical properties of the adhesive layers is prevented, and thus improved reliability evaluation results are achieved.

In a flexible display device of an embodiment, a plurality of adhesive layers may exhibit excellent adhesive properties and flexibility while effectively blocking ultraviolet light, even under deformation conditions, such as folding and bending, of the display device, and thus, the flexible display device may have improved reliability.

In a flexible display device of an embodiment, a plurality of adhesive layers including ultraviolet absorbing agents are used to block ultraviolet light, and thus, when compared to cases in which ultraviolet light is blocked in only a single adhesive layer, the adhesive properties of the adhesive layers can be better maintained while effectively blocking ultraviolet light. As a result, improved display quality may be achieved.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

Therefore, the technical scope of the present invention is not limited to the content of the detailed description of the present specification, but is to be determined only by the claims, and equivalents thereof.

What is claimed is:

1. A flexible display device including a bending region and a non-bending region, the flexible display device comprising:
    a display panel;
    a polarizing member on the display panel including an optical layer, a polarizer on the optical layer, and one or more inner adhesive layers between the optical layer and the polarizer;
    a window member on the polarizing member;
    a first outer adhesive layer between the display panel and the polarizing member; and
    a second outer adhesive layer between the polarizing member and the window member,
    wherein each of at least two adhesive layers among the one or more inner adhesive layers, the first outer adhesive layer, and the second outer adhesive layer includes at least 0.1 wt % to less than 5 wt % of an ultraviolet absorbing agent.

2. The flexible display device of claim 1, wherein, when the transmittance of the polarizing member is T1, the transmittance of the first outer adhesive layer is T2, and the transmittance of the second outer adhesive layer is T3, T1×T2×T3≤6% is satisfied in the wavelength region of 310 to 410 nm.

3. The flexible display device of claim 1, wherein, when the transmittance of the polarizing member is T1, the transmittance of the first outer adhesive layer is T2, and the transmittance of the second outer adhesive layer is T3, T1×T2×T3≤5% is satisfied in the wavelength region of 310 to 380 nm.

4. The flexible display device of claim 1, wherein:
the optical layer includes a λ/4 retardation layer;
the one or more inner adhesive layers include a first inner adhesive layer that is between the λ/4 retardation layer and the polarizer; and
the first inner adhesive layer includes the ultraviolet absorbing agent.

5. The flexible display device of claim 1, wherein:
the optical layer includes a λ/4 retardation layer and a λ/2 retardation layer between the λ/4 retardation layer and the polarizer;
the one or more inner adhesive layers include a first inner adhesive layer between the λ/4 retardation layer and the λ/2 retardation layer, and a second inner adhesive layer between the λ/2 retardation layer and the polarizer; and
at least one among the first inner adhesive layer and the second inner adhesive layer includes the ultraviolet absorbing agent.

6. The flexible display device of claim 1, wherein:
the optical layer includes a λ/4 retardation layer and a positive C-plate layer between the λ/4 retardation layer and the first outer adhesive layer;
the one or more inner adhesive layers include a first inner adhesive layer between the λ/4 retardation layer and the polarizer, and a second inner adhesive layer between the positive C-plate layer and the λ/4 retardation layer; and
at least one among the first inner adhesive layer and the second inner adhesive layer includes the ultraviolet absorbing agent.

7. The flexible display device of claim 1, wherein the ultraviolet absorbing agent includes at least one of benzotriazole-based, benzophenone-based, salicylic acid-based, salicylate-based, cyanoacrylate-based, cinnamate-based, oxanilide-based, polystyrene-based, polyferrocenylsilane-based, methine-based, azomethine-based, triazine-based, para-aminobenzoic acid-based, cinnamic acid-based, or urocanic acid-based light absorbing dyes, or combinations thereof.

8. The flexible display device of claim 1, wherein the storage modulus at room temperature (25° C.) of each of the one or more inner adhesive layers, the first outer adhesive layer, and the second outer adhesive layer is $1.0 \times 10^3$ Pa or more to $6.0 \times 10^5$ Pa or less.

9. The flexible display device of claim 1, wherein the storage modulus at −40° C. of each of the one or more inner adhesive layers, the first outer adhesive layer, and the second outer adhesive layer is $1.0 \times 10^5$ Pa or more to $5.0 \times 10^7$ Pa or less.

10. The flexible display device of claim 1, wherein the thickness of the one or more inner adhesive layers is 5 μm or greater to 30 μm or less.

11. The flexible display device of claim 1, wherein the thickness of each of the first outer adhesive layer and the second outer adhesive layer is 5 μm or greater to 100 μm or less.

12. The flexible display device of claim 1, wherein at least one among the one or more inner adhesive layers, the first outer adhesive layer, and the second outer adhesive layer further includes a moisture scavenger and/or a moisture blocker.

13. The flexible display device of claim 1, wherein when the display panel, the polarizing member, and the window member are bent along a bending axis in a first mode and not bent in a second mode, the window member is closer than the display panel is to the bending axis in the first mode.

14. The flexible display device of claim 1, wherein when the display panel, the polarizing member, and the window member are bent along a bending axis in a third mode and not bent in a fourth mode, the display panel is closer than the window member is to the bending axis in the third mode.

15. The flexible display device of claim 1, wherein the bending region has a radius of curvature of 5 mm or less.

16. A flexible display device including a bending region and a non-bending region, the flexible display device comprising:
a display panel;
a polarizing member on the display panel including an optical layer, a polarizer on the optical layer, and one or more inner adhesive layers between the optical layer and the polarizer;
a window member on the polarizing member;
a first outer adhesive layer between the display panel and the polarizing member;
a second outer adhesive layer between the polarizing member and the window member, each of at least two adhesive layers among the one or more inner adhesive layers, the first outer adhesive layer, and the second outer adhesive layer including an ultraviolet absorbing agent; and
an input sensing unit on the display panel, wherein the input sensing unit is on a top face or bottom face of the polarizing member.

17. The flexible display device of claim 16, further comprising a third outer adhesive layer on the top face or bottom face of the input sensing unit, wherein, when the transmittance of the polarizing member is T1, the transmittance of the first outer adhesive layer is T2, the transmittance of the second outer adhesive layer is T3, and the transmittance of the third outer adhesive layer is T4, $T1 \times T2 \times T3 \times T4 \leq 6\%$ is satisfied in the wavelength region of 310 nm to 410 nm.

18. A flexible display device comprising:
a display panel including a bending region and a non-bending region;
a polarizing member on the display panel including a polarizer and an optical layer below the polarizer;
a window member disposed on the polarizing member; and
a plurality of adhesive layers respectively disposed between the display panel and polarizing member, between the polarizing member and window member, and between the polarizer and optical layer,
wherein each of two or more of the adhesive layers includes at least 0.1 wt % to less than 5 wt % of an ultraviolet absorbing agent.

19. The flexible display device of claim 18, wherein, when the transmittance of the polarizing member is Tp, and the transmittance of the adhesive layers is Ta, $Tp \times Ta\ 6\%$ is satisfied in the wavelength region of 310 nm to 410 nm.

20. A flexible display device comprising:
a display panel including a bending region, the bending region having a shape that is bent along a bending axis that extends in a direction, or being bendable along said bending axis;
a polarizing member on the display panel including an optical layer, a polarizer on the optical layer, and one or more inner adhesive layers between the optical layer and the polarizer; and
one or more outer adhesive layers disposed on a top face or bottom face of the polarizing member,
wherein each of at least two among the one or more inner adhesive layers and the one or more outer adhesive layers includes at least 0.1 wt % to less than 5 wt % of an ultraviolet absorbing agent.

* * * * *

UNITED STATES PATENT AND TRADEMARK OFFICE
CERTIFICATE OF CORRECTION

PATENT NO. : 10,620,465 B2
APPLICATION NO. : 16/039069
DATED : April 14, 2020
INVENTOR(S) : Heeyoung Lee et al.

Page 1 of 1

It is certified that error appears in the above-identified patent and that said Letters Patent is hereby corrected as shown below:

In the Claims

Column 26, Line 53, Claim 19 delete "Ta 6%" and insert -- Ta ≤ 6% --

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*